US011460538B2

(12) United States Patent
Gillian

(10) Patent No.: US 11,460,538 B2
(45) Date of Patent: Oct. 4, 2022

(54) DETECTING A FRAME-OF-REFERENCE CHANGE IN A SMART-DEVICE-BASED RADAR SYSTEM

(71) Applicant: Google LLC, Mountain View, CA (US)

(72) Inventor: Nicholas Edward Gillian, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 139 days.

(21) Appl. No.: 16/911,116

(22) Filed: Jun. 24, 2020

(65) Prior Publication Data
US 2021/0156957 A1 May 27, 2021

Related U.S. Application Data

(63) Continuation of application No. PCT/US2019/063776, filed on Nov. 27, 2019.

(51) Int. Cl.
G01S 13/88 (2006.01)
G01S 7/295 (2006.01)
G01S 13/53 (2006.01)
G06F 3/01 (2006.01)

(52) U.S. Cl.
CPC ............ *G01S 7/2955* (2013.01); *G01S 13/53* (2013.01); *G01S 13/88* (2013.01); *G06F 3/017* (2013.01)

(58) Field of Classification Search
CPC ...... G01S 13/34; G01S 13/584; G01S 13/931; G01S 7/411
See application file for complete search history.

(56) References Cited

U.S. PATENT DOCUMENTS 10,042,041 B2 8/2018 Preussner
2021/0255304 A1* 8/2021 Fontijne ................. G06V 20/70

FOREIGN PATENT DOCUMENTS

DE 102018202903 8/2019
WO 2017032977 3/2017
(Continued)

OTHER PUBLICATIONS

"International Search Report and Written Opinion", Application No. PCT/US2019/063776, dated Jul. 31, 2020, 18 pages.
(Continued)

*Primary Examiner* — Timothy A Brainard
(74) *Attorney, Agent, or Firm* — Colby Nipper PLLC

(57) ABSTRACT

Techniques and apparatuses are described that implement a smart-device-based radar system capable of detecting a frame-of-reference change. In particular, a radar system includes a frame-of-reference machine-learned module trained to recognize whether or not the radar system's frame of reference changes. The frame-of-reference machine-learned module analyzes complex radar data generated from at least one chirp of a reflected radar signal to analyze a relative motion of at least one object over time. By analyzing the complex radar data directly using machine learning, the radar system can operate as a motion sensor without relying on non-radar-based sensors, such as gyroscopes, inertial sensors, or accelerometers. With knowledge of whether the frame-of-reference is stationary or moving, the radar system can determine whether or not a gesture is likely to occur and, in some cases, compensate for the relative motion of the radar system itself.

20 Claims, 14 Drawing Sheets

(56) References Cited

FOREIGN PATENT DOCUMENTS

| | | |
|---|---|---|
| WO | 2019195327 | 10/2019 |
| WO | 2020113160 | 6/2020 |

OTHER PUBLICATIONS

CEN, "Precise Ego-Motion Estimation with Millimeter-Wave Radar Under Diverse and Challenging Conditions", May 2018, pp. 6045-6052.
Gu, et al., "Motion Sensing Using Radar: Gesture Interaction and Beyond", Aug. 2019, pp. 44-57.
"International Preliminary Report on Patentability", Application No. PCT/US2019/063776, dated May 17, 2022, 10 pages.

* cited by examiner

DETECTING A FRAME-OF-REFERENCE CHANGE IN A SMART-DEVICE-BASED RADAR SYSTEM

PRIORITY APPLICATION

This application claims priority to and is a continuation application of International Application No. PCT/US2019/063776, filed Nov. 27, 2019, the disclosure of which is incorporated herein by reference in its entirety.

BACKGROUND

Radars are useful devices that can detect objects. Relative to other types of sensors, like a camera, a radar can provide improved performance in many different environmental conditions, such as low lighting and fog, or with moving or overlapping objects. Radar can also detect objects through one or more occlusions, such as a purse or a pocket. While radar has many advantages, there are many challenges associated with integrating radar in electronic devices.

One challenge involves operating the radar in an electronic device that can move, such as a mobile device or a wearable device. With the potential for the radar to operate while the electronic device is stationary or moving, there is an uncertainty regarding whether the radar's frame of reference is fixed or changing. This can make it challenging for the radar to differentiate between situations in which the radar is stationary and an object is moving, the object is stationary and the radar is moving, or both the radar and the object are moving.

SUMMARY

Techniques and apparatuses are described that implement a smart-device-based radar system capable of detecting a frame-of-reference change. A radar system includes a frame-of-reference machine-learned module, which is trained to operate as a motion sensor. The frame-of-reference machine-learned module uses machine learning to recognize whether or not the radar system's frame of reference changes. In particular, the frame-of-reference machine-learned module analyzes complex radar data generated from at least one chirp of a reflected radar signal to identify subtle patterns in a relative motion of at least one object over time. In some cases, the frame-of-reference machine-learned module compares (e.g., correlates) relative motions of two or more objects. By analyzing the complex radar data directly using machine learning, the frame-of-reference machine-learned module can determine whether the radar system's frame of reference changes without relying on non-radar-based sensors, such as gyroscopes, inertial sensors, or accelerometers. With knowledge of whether the frame-of-reference is stationary or moving, the radar system can determine whether or not a gesture is likely to occur and, in some cases, compensate for the relative motion of the radar system itself.

Aspects described below include a method performed by a radar system for detecting a frame-of-reference change. The method includes transmitting a first radar transmit signal and receiving a first radar receive signal. The first radar receive signal comprises a version of the first radar transmit signal that is reflected by at least one object. The method also includes generating complex radar data based on the first radar receive signal. The method additionally includes analyzing the complex radar data using machine learning to detect a change in the radar system's frame of reference.

Aspects described below also include an apparatus comprising a radar system configured to perform any of the described methods.

Aspects described below include a computer-readable storage media comprising computer-executable instructions that, responsive to execution by a processor, implement a frame-of-reference machine-learned module configured to accept complex radar data associated with a radar receive signal that is reflected by at least one object. The frame-of-reference machine-learned module is also configured to analyze the complex radar data using machine learning to generate frame-of-reference data. The frame-of-reference machine-learned module is additionally configured to determine, based on the frame-of-reference data, whether or not an antenna array that received the radar receive signal is stationary or moving.

Aspects described below also include a system with machine-learning means for detecting a frame-of-reference change based on complex radar data.

BRIEF DESCRIPTION OF THE DRAWINGS

Apparatuses for and techniques implementing a smart-device-based radar system capable of detecting a frame-of-reference change are described with reference to the following drawings. The same numbers are used throughout the drawings to reference like features and components:

FIG. 2-1 illustrates an example implementation of a radar system as part of a smart device.

FIG. 2-2 illustrates an example implementation of a frame-of-reference machine-learned module.

FIG. 3-1 illustrates operation of an example radar system.

FIG. 3-2 illustrates an example radar framing structure for detecting a frame-of-reference change.

FIG. 7-1 illustrates an example space time neural network for detecting a frame-of-reference change.

FIG. 7-2 illustrates an example chirp-level analysis module of a space time neural network.

FIG. 7-3 illustrates an example feature-level analysis module of a space time neural network.

FIG. 7-4 illustrates an example main-level analysis module of a space time neural network.

DETAILED DESCRIPTION

Overview

Figure 1:
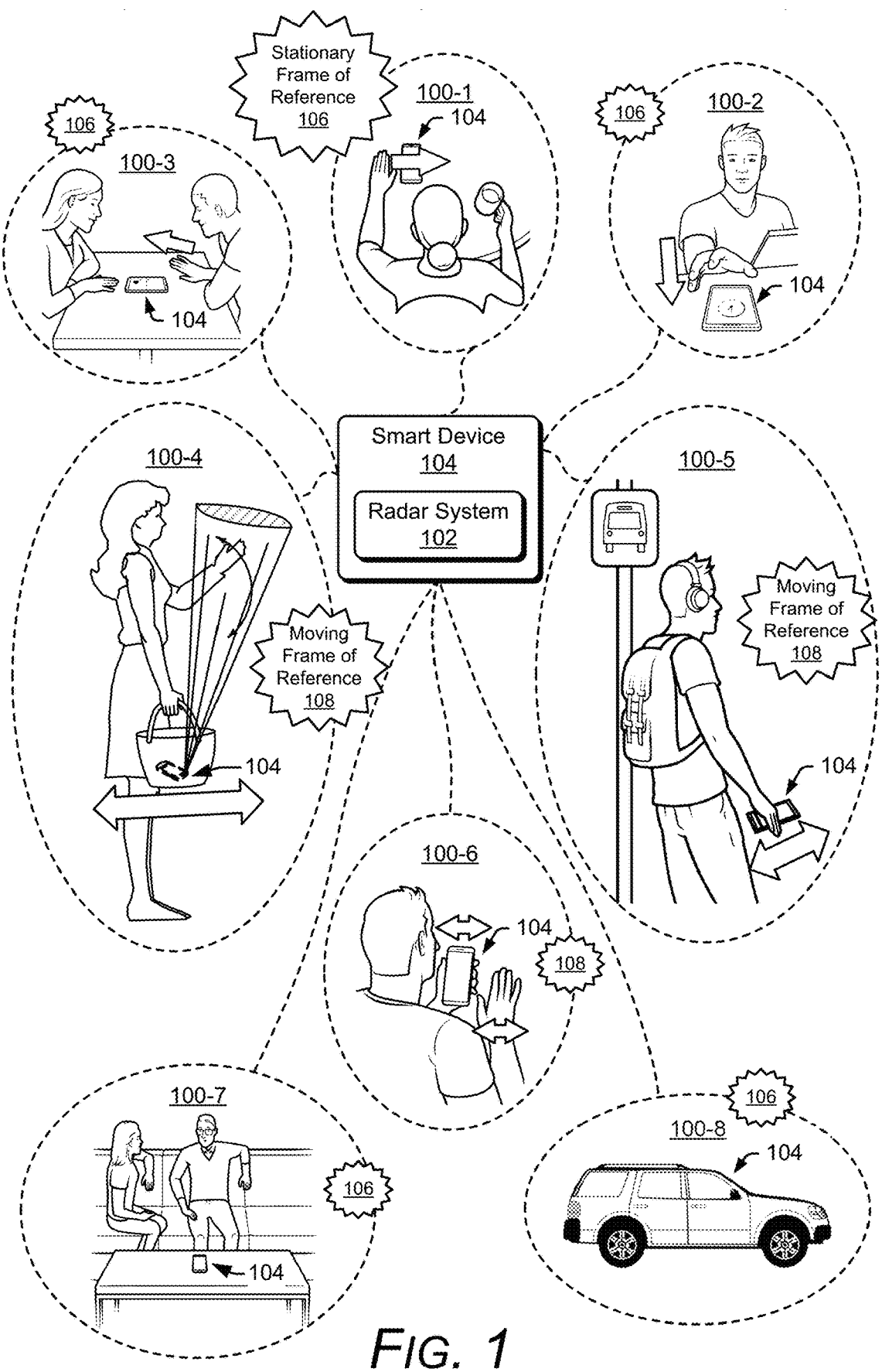
FIG. 1 illustrates example environments in which a smart-device-based radar system capable of detecting a frame-of-reference change can be implemented.

Integrating a radar system within an electronic device can be challenging. One challenge involves operating the radar system in an electronic device that can move, such as a mobile device or a wearable device. Due to the potential for the radar system to operate while the electronic device is stationary or moving, there is an uncertainty regarding whether the radar system's frame of reference is fixed or changing. This can make it challenging for the radar system to differentiate between situations in which the radar system is stationary and an object is moving towards the radar system, the object is stationary and the radar system is moving towards the object, or both the radar system and the object are moving towards each other. Without knowing whether the frame of reference is fixed or changing, the radar system may attempt to recognize a gesture in a situation in which the user is simply moving the electronic device and not performing a gesture.

Some techniques may augment the radar system with additional motion sensors. However, these motion sensors can increase power consumption and cost of the electronic device. Additionally, it can be challenging to integrated the motion sensors within a space-constrained electronic device. Other closed-form signal processing techniques may model different situations in which the radar system and other objects are moving. However, it can be challenging to model non-uniform motions, including intentional and unintentional motions performed by a user. These motions can include situations in which the user handles an electronic device that includes the radar system or situations in which the user moves while in proximity to the radar system.

In contrast, this document describes techniques and devices that implement a smart-device-based radar system capable of detecting a frame-of-reference change. A radar system includes a frame-of-reference machine-learned module, which is trained to operate as a motion sensor. The frame-of-reference machine-learned module uses machine learning to recognize whether or not the radar system's frame of reference changes. In particular, the frame-of-reference machine-learned module analyzes complex radar data generated from at least one chirp of a reflected radar signal to identify subtle patterns in a relative motion of at least one object over time. In some cases, the frame-of-reference machine-learned module compares (e.g., correlates) relative motions of two or more objects. By analyzing the complex radar data directly using machine learning, the frame-of-reference machine-learned module can determine whether the radar system's frame of reference changes without relying on non-radar-based sensors, such as gyroscopes, inertial sensors, or accelerometers. With knowledge of whether the frame-of-reference is stationary or moving, the radar system can determine whether or not a gesture is likely to occur and, in some cases, compensate for the relative motion of the radar system itself.

Example Environment

FIG. 1 is an illustration of example environments 100-1 to 100-8 in which techniques using, and an apparatus including, a smart-device-based radar system capable of detecting a frame-of-reference may be embodied. In the depicted environments 100-1 to 100-8, a smart device 104 includes a radar system 102 capable of detecting one or more objects (e.g., users) using machine learning. The smart device 104 is shown to be a smartphone in environments 100-1 to 100-7 and a smart vehicle in the environment 100-8.

In the environments 100-1 to 100-4 and 100-6, a user performs different types of gestures, which are detected by the radar system 102. In some cases, the user performs a gesture using an appendage or body part. Alternatively, the user can also perform a gesture using a stylus, a hand-held object, a ring, or any type of material that can reflect radar signals.

In environment 100-1, the user makes a scrolling gesture by moving a hand above the smart device 104 along a horizontal dimension (e.g., from a left side of the smart device 104 to a right side of the smart device 104). In the environment 100-2, the user makes a reaching gesture, which decreases a distance between the smart device 104 and the user's hand. The users in environment 100-3 make hand gestures to play a game on the smart device 104. In one instance, a user makes a pushing gesture by moving a hand above the smart device 104 along a vertical dimension (e.g., from a bottom side of the smart device 104 to a top side of the smart device 104). In the environment 100-4, the smart device 104 is stored within a purse, and the radar system 102 provides occluded-gesture recognition by detecting gestures that are occluded by the purse. In the environment 100-6, the user waves their hand in front of the smart device 104.

The radar system 102 can also recognize other types of gestures or motions not shown in FIG. 1. Example types of gestures include a knob-turning gesture in which a user curls their fingers to grip an imaginary doorknob and rotate their fingers and hand in a clockwise or counter-clockwise fashion to mimic an action of turning the imaginary doorknob. Another example type of gesture includes a spindle-twisting gesture, which a user performs by rubbing a thumb and at least one other finger together. The gestures can be two-dimensional, such as those used with touch-sensitive displays (e.g., a two-finger pinch, a two-finger spread, or a tap). The gestures can also be three-dimensional, such as many sign-language gestures, e.g., those of American Sign Language (ASL) and other sign languages worldwide. Upon detecting each of these gestures, the smart device 104 can perform an action, such as display new content, move a cursor, activate one or more sensors, open an application, and so forth. In this way, the radar system 102 provides touch-free control of the smart device 104.

In the environment 100-7, the radar system 102 generates a three-dimensional map of a surrounding environment for contextual awareness. The radar system 102 also detects and tracks multiple users to enable both users to interact with the smart device 104. The radar system 102 can also perform vital-sign detection. In the environment 100-8, the radar system 102 monitors vital signs of a user that drives a vehicle. Example vital signs include a heart rate and a respiration rate. If the radar system 102 determines that the driver is falling asleep, for instance, the radar system 102 can cause the smart device 104 to alert the user. Alternatively, if the radar system 102 detects a life-threatening emergency, such as a heart attack, the radar system 102 can cause the smart device 104 to alert a medical professional or emergency services.

In different environments 100-1 to 100-8, the radar system 102 may be stationary or moving. In the environments 100-1 to 100-3 and 100-7, for instance, the smart device 104 is positioned on a non-moving surface, such as a table. In this situation, the radar system 102's frame of reference is stationary (e.g., fixed) 106 while one or more objects (e.g., users) move. In contrast, environment 100-5 illustrates a situation in which a portion of the user that is visible to the radar system 102 remains stationary and the radar system 102 moves. In particular, the user swings their arm in a manner that causes the smart device 104 to pass by their leg. In this case, the radar system 102's frame of reference is moving 108 (e.g., changing) while the portion of the user observed by the radar system 102 is stationary. In still other environments, both the user and the radar system 102 move. As an example, the users in environments 100-4 and 100-6 move the radar system 102 (intentionally or unintentionally)

while performing a gesture. To distinguish between these different situations, the radar system 102 uses machine learning to detect a frame-of-reference change, as further described with respect to FIG. 2.

Some implementations of the radar system 102 are particularly advantageous as applied in the context of smart devices 104, for which there is a convergence of issues. This can include a need for limitations in a spacing and layout of the radar system 102 and low power. Exemplary overall lateral dimensions of the smart device 104 can be, for example, approximately eight centimeters by approximately fifteen centimeters. Exemplary footprints of the radar system 102 can be even more limited, such as approximately four millimeters by six millimeters with antennas included. Exemplary power consumption of the radar system 102 may be on the order of a few milliwatts to tens of milliwatts (e.g., between approximately two milliwatts and twenty milliwatts). The requirement of such a limited footprint and power consumption for the radar system 102 enables the smart device 104 to include other desirable features in a space-limited package (e.g., a camera sensor, a fingerprint sensor, a display, and so forth). The smart device 104 and the radar system 102 are further described with respect to FIG. 2.

Figures 1, 2:
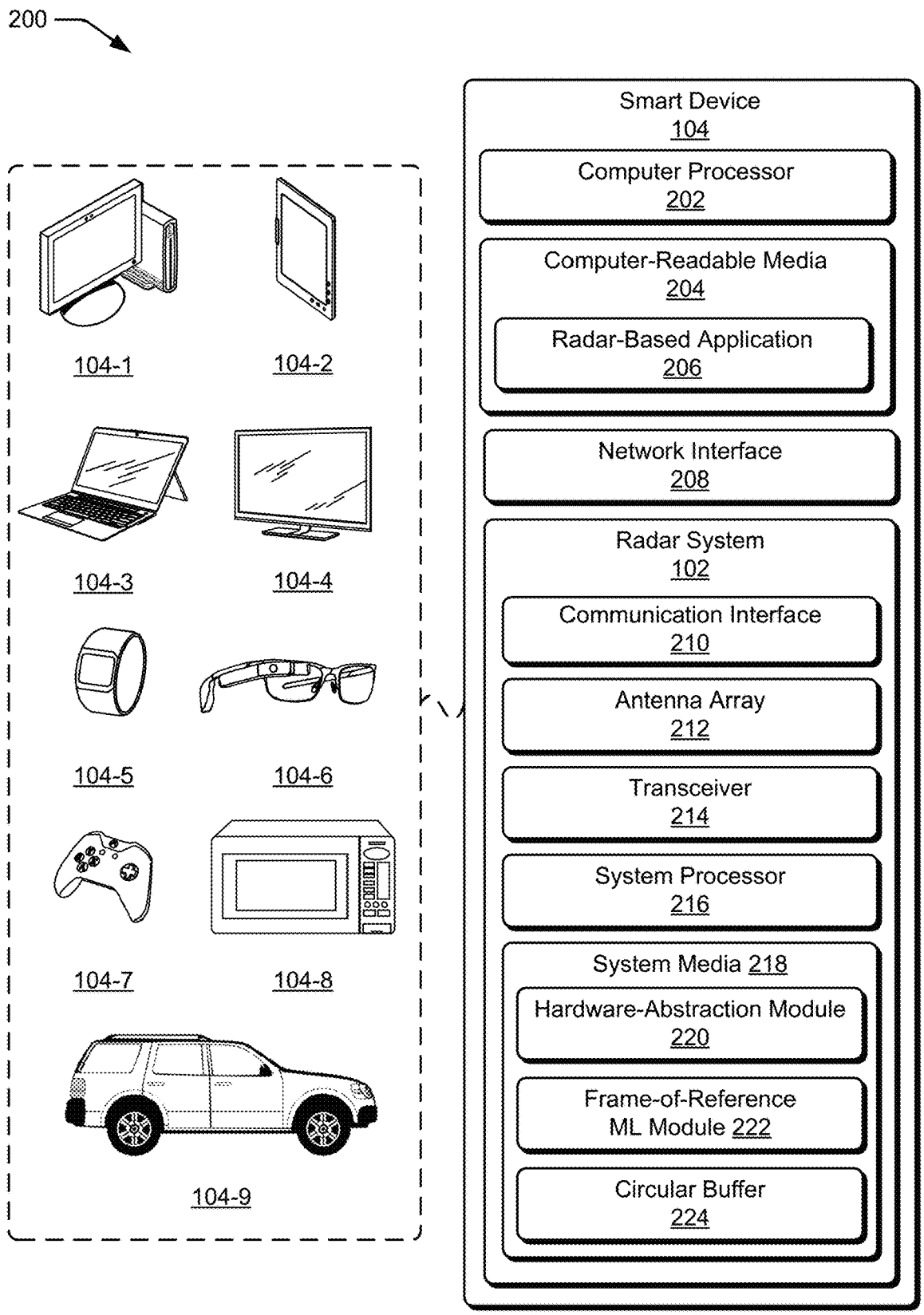
Figure 2:
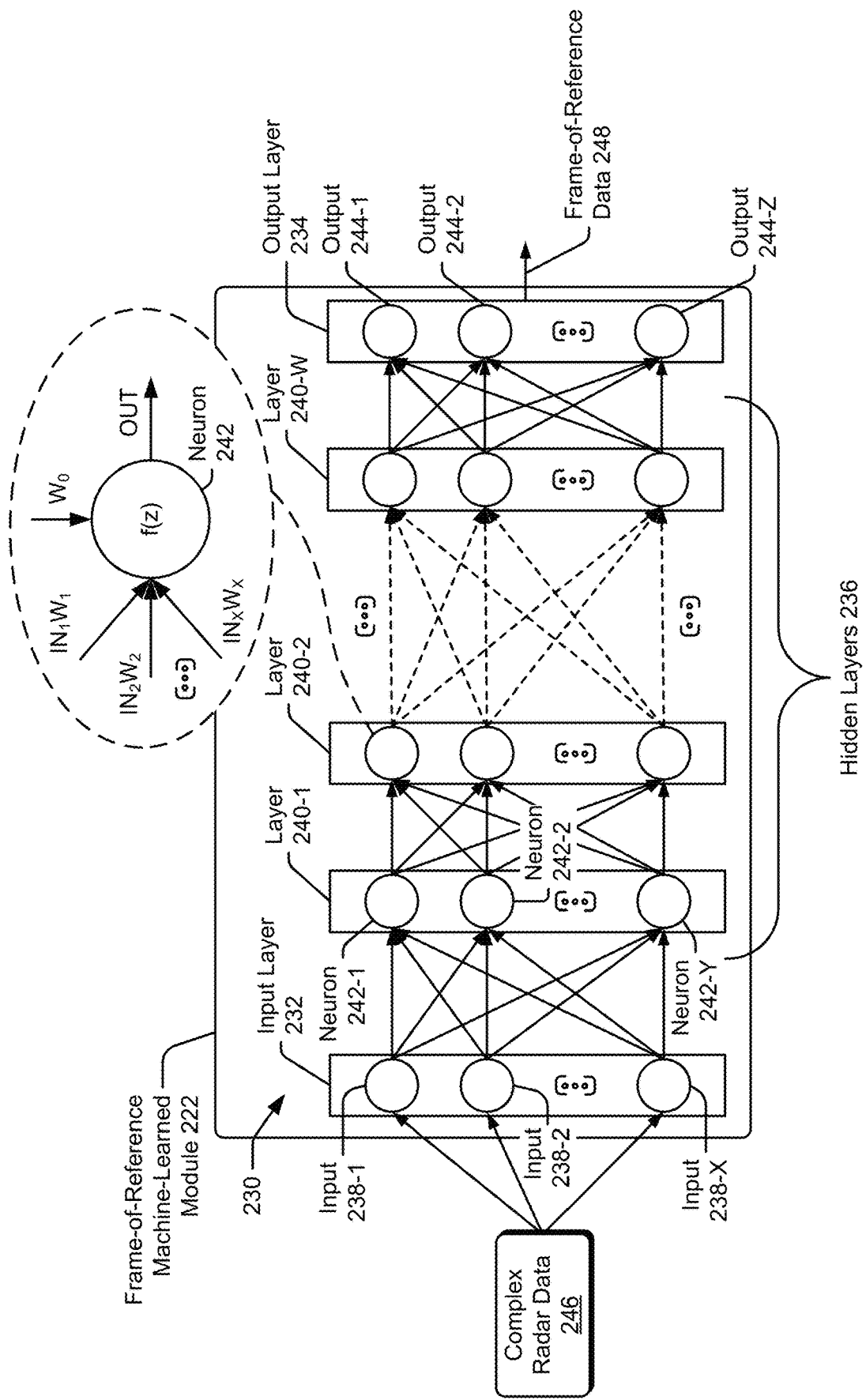

FIG. 2-1 illustrates the radar system 102 as part of the smart device 104. The smart device 104 is illustrated with various non-limiting example devices including a desktop computer 104-1, a tablet 104-2, a laptop 104-3, a television 104-4, a computing watch 104-5, computing glasses 104-6, a gaming system 104-7, a microwave 104-8, and a vehicle 104-9. Other devices may also be used, such as a home service device, a smart speaker, a smart thermostat, a security camera, a baby monitor, a Wi-Fi™ router, a drone, a trackpad, a drawing pad, a netbook, an e-reader, a home-automation and control system, a wall display, and another home appliance. Note that the smart device 104 can be wearable, non-wearable but mobile, or relatively immobile (e.g., desktops and appliances). The radar system 102 can be used as a stand-alone radar system or used with, or embedded within, many different smart devices 104 or peripherals, such as in control panels that control home appliances and systems, in automobiles to control internal functions (e.g., volume, cruise control, or even driving of the car), or as an attachment to a laptop computer to control computing applications on the laptop.

The smart device 104 includes one or more computer processors 202 and computer-readable media 204, which includes memory media and storage media. Applications and/or an operating system (not shown) embodied as computer-readable instructions on the computer-readable media 204 can be executed by the computer processor 202 to provide some of the functionalities described herein. The computer-readable media 204 also includes a radar-based application 206, which uses radar data generated by the radar system 102 to perform a function, such as motion sensing, presence detection, gesture-based touch-free control, collision avoidance for autonomous driving, human vital-sign notification, and so forth.

The smart device 104 can also include a network interface 208 for communicating data over wired, wireless, or optical networks. For example, the network interface 208 may communicate data over a local-area-network (LAN), a wireless local-area-network (WLAN), a personal-area-network (PAN), a wire-area-network (WAN), an intranet, the Internet, a peer-to-peer network, point-to-point network, a mesh network, and the like. The smart device 104 may also include a display (not shown).

The radar system 102 includes a communication interface 210 to transmit the radar data to a remote device, though this need not be used when the radar system 102 is integrated within the smart device 104. In general, the radar data provided by the communication interface 210 is in a format usable by the radar-based application 206.

The radar system 102 also includes at least one antenna array 212 and at least one transceiver 214 to transmit and receive radar signals. The antenna array 212 includes at least one transmit antenna element and at least two receive antenna elements. In some situations, the antenna array 212 includes multiple transmit antenna elements to implement a multiple-input multiple-output (MIMO) radar capable of transmitting multiple distinct waveforms at a given time (e.g., a different waveform per transmit antenna element). The antenna elements can be circularly polarized, horizontally polarized, vertically polarized, or a combination thereof.

The receive antenna elements of the antenna array 212 can be positioned in a one-dimensional shape (e.g., a line) or a two-dimensional shape (e.g., a rectangular arrangement, a triangular arrangement, or an "L" shape arrangement) for implementations that include three or more receive antenna elements. The one-dimensional shape enables the radar system 102 to measure one angular dimension (e.g., an azimuth or an elevation) while the two-dimensional shape enables the radar system 102 to measure two angular dimensions (e.g., to determine both an azimuth angle and an elevation angle of the object 302). An element spacing associated with the receive antenna elements can be less than, greater than, or equal to half a center wavelength of the radar signal.

Using the antenna array 212, the radar system 102 can form beams that are steered or un-steered, wide or narrow, or shaped (e.g., hemisphere, cube, fan, cone, cylinder). The steering and shaping can be achieved through analog beamforming or digital beamforming. The one or more transmitting antenna elements can have, for instance, an un-steered omnidirectional radiation pattern or can produce a wide steerable beam to illuminate a large volume of space. To achieve target angular accuracies and angular resolutions, the receiving antenna elements can be used to generate hundreds or thousands of narrow steered beams with digital beamforming. In this way, the radar system 102 can efficiently monitor an external environment and detect one or more users.

The transceiver 214 includes circuitry and logic for transmitting and receiving radar signals via the antenna array 212. Components of the transceiver 214 can include amplifiers, mixers, switches, analog-to-digital converters, or filters for conditioning the radar signals. The transceiver 214 also includes logic to perform in-phase/quadrature (I/Q) operations, such as modulation or demodulation. A variety of modulations can be used, including linear frequency modulations, triangular frequency modulations, stepped frequency modulations, or phase modulations. Alternatively, the transceiver 214 can produce radar signals having a relatively constant frequency or a single tone. The transceiver 214 can be configured to support continuous-wave or pulsed radar operations.

A frequency spectrum (e.g., range of frequencies) that the transceiver 214 uses to generate the radar signals can encompass frequencies between 1 and 400 gigahertz (GHz), between 4 and 100 GHz, between 1 and 24 GHz, between 2 and 4 GHz, between 57 and 64 GHz, or at approximately 2.4 GHz. In some cases, the frequency spectrum can be divided into multiple sub-spectrums that have similar or different bandwidths. The bandwidths can be on the order of 500 megahertz (MHz), 1 GHz, 2 GHz, and so forth. Different frequency sub-spectrums may include, for example, frequencies between approximately 57 and 59 GHz, 59 and 61 GHz, or 61 and 63 GHz. Although the example frequency sub-spectrums described above are contiguous, other frequency sub-spectrums may not be contiguous. To achieve coherence, multiple frequency sub-spectrums (contiguous or not) that have a same bandwidth may be used by the transceiver 214 to generate multiple radar signals, which are transmitted simultaneously or separated in time. In some situations, multiple contiguous frequency sub-spectrums may be used to transmit a single radar signal, thereby enabling the radar signal to have a wide bandwidth.

The radar system 102 also includes one or more system processors 216 and a system media 218 (e.g., one or more computer-readable storage media). The system media 218 optionally includes a hardware-abstraction module 220 and at least one circular buffer 224. The system media 218 also includes at least one frame-of-reference machine-learned (ML) module 222. The hardware-abstraction module 220, the frame-of-reference machine-learned module 222, and the circular buffer 224 can be implemented using hardware, software, firmware, or a combination thereof. In this example, the system processor 216 implements the hardware-abstraction module 220 and the frame-of-reference machine-learned module 222. The system processor 216 or a memory controller can implement and manage the circular buffer 224. Together, the hardware-abstraction module 220, the frame-of-reference machine-learned module 222, and the circular buffer 224 enable the system processor 216 to process responses from the receive antenna elements in the antenna array 212 to detect a user, determine a position of the object, recognize a gesture performed by the user, and/or detect a frame-of-reference change.

In an alternative implementation (not shown), the hardware-abstraction module 220, the frame-of-reference machine-learned module 222, or the circular buffer 224 are included within the computer-readable media 204 and implemented by the computer processor 202. This enables the radar system 102 to provide the smart device 104 raw data via the communication interface 210 such that the computer processor 202 can process the raw data for the radar-based application 206.

The hardware-abstraction module 220 transforms raw data provided by the transceiver 214 into hardware-agnostic complex radar data, which can be processed by the frame-of-reference machine-learned module 222. In particular, the hardware-abstraction module 220 conforms complex radar data from a variety of different types of radar signals to an expected input of the frame-of-reference machine-learned module 222. This enables the frame-of-reference machine-learned module 222 to process different types of radar signals received by the radar system 102, including those that utilize different modulations schemes for frequency-modulated continuous-wave radar, phase-modulated spread spectrum radar, or impulse radar. The hardware-abstraction module 220 can also normalize complex radar data from radar signals with different center frequencies, bandwidths, transmit power levels, or pulsewidths.

Additionally, the hardware-abstraction module 220 conforms complex radar data generated using different hardware architectures. Different hardware architectures can include different antenna arrays 212 positioned on different surfaces of the smart device 104 or different sets of antenna elements within an antenna array 212. By using the hardware-abstraction module 220, the frame-of-reference machine-learned module 222 can process complex radar data generated by different sets of antenna elements with different gains, different sets of antenna elements of various quantities, or different sets of antenna elements with different antenna element spacings.

With the hardware-abstraction module 220, the frame-of-reference machine-learned module 222 can operate in radar systems 102 with different limitations that affect the available radar modulation schemes, transmission parameters, or types of hardware architectures. The hardware-abstraction module 220 is further described with respect to FIGS. 5 and 6.

The frame-of-reference machine-learned module 222 uses machine learning to analyze complex radar data, such as the hardware-agnostic complex radar data, and determine whether the radar system 102's frame of reference is stationary or moving. In particular, the frame-of-reference machine-learned module 222 analyzes a relative motion of at least one object over time and/or compares (e.g., correlates) relative motions of two or more objects. The frame-of-reference machine-learned module 222 can analyze both magnitude and phase information of the complex radar data to improve accuracies for detecting a change in the frame-of-reference. A design of the frame-of-reference machine-learned module 222 can be tailored to support smart devices 104 with different amounts of available memory, different amounts available power, or different computational capabilities. In some cases, the frame-of-reference machine-learned module 222 includes a suite of machine-learning architectures that can be individually selected according to the type of smart device 104 or the radar-based application 206.

In some cases, the frame-of-reference machine-learned module 222 implements a portion of a gesture recognition module (not shown) or provides frame-of-reference data to the gesture recognition module. The gesture recognition module can use the frame-of-reference data to determine whether or not a gesture is likely performed. For example, if the frame-of-reference data indicates that the radar system 102's frame of reference is moving, the gesture recognition module can determine that the detected motion of the user is due, at least in part, to the moving frame of reference. As such, it is less likely that the user is performing an intentional gesture while moving the radar system 102. In this case, the gesture recognition module may decide to not perform gesture recognition in order to avoid potential false alarms. In contrast, if the frame-of-reference data indicates that the radar system 102's frame of reference is stationary, the gesture recognition module can determine that the detected motion of the user likely represents an intentional gesture. In this case, the gesture recognition module may decide to perform gesture recognition.

Additionally or alternatively, the frame-of-reference machine-learned module 222 determines one or more characteristics regarding the change in the frame of reference, which describes a trajectory of the radar system 102. These characteristics can be used to update a clutter map that is maintained by the radar system 102 or determine an absolute motion of the object by removing motion components caused by the motion of the radar system 102, for instance. In some cases, the radar system 102 maps an external environment and determines a position of the smart device 104 relative to stationary objects within the external environment, such as furniture, walls, buildings, or street signs. Using the frame-of-reference machine-learned module 222, the radar system 102 can update its known position within the external environment.

In some implementations, the radar system 102 obviates the use of other motion sensors, and can be used to determine an orientation, acceleration, or position of the smart device 104. In this manner, space-constrained devices, such as wearable devices, can utilize the radar system 102 to provide motion data in addition to data for the radar-based application 206.

The circular buffer 224 is a fixed-size memory buffer implemented using an allocated portion of memory within the system media 218. The circular buffer 224 includes multiple memory elements and provides a first-in-first-out queue in which data is sequentially stored and accessed using the memory elements. Once all of the memory elements store data, the oldest data stored is overwritten. In some implementations of the frame-of-reference machine-learned module 222, the circular buffer 224 is implemented between two stages of the frame-of-reference machine-learned module 222. As such, the circular buffer 224 stores data generated by a first stage of the frame-of-reference machine-learned module 222 and enables a second stage of the frame-of-reference machine-learned module 222 to access the stored data. The circular buffer 224 is further described with respect to FIG. 7-3. With or without the hardware-abstraction module 220 and the circular buffer 224, the frame-of-reference machine-learned module 222 can implement, at least partially, detection of a frame-of-reference, as further described with respect to FIG. 2-2.

FIG. 2-2 illustrates an example implementation of the frame-of-reference machine-learned module 222. The frame-of-reference machine-learned module 222 can include one or more artificial neural networks (referred to herein as neural networks). A neural network includes a group of connected nodes (e.g., neurons or perceptrons), which are organized into one or more layers. As an example, the frame-of-reference machine-learned module 222 includes a deep neural network 230, which includes an input layer 232, an output layer 234, and one or more hidden layers 236 positioned between the input layer 232 and the output layer 234. The nodes of the deep neural network 230 can be partially-connected or fully connected between the layers.

The input layer 232 includes multiple inputs 238-1, 2388-2 ... 238-X, where X represents a positive integer. The multiple hidden layers 236 include layers 240-1, 240-2 ... 240-W, where W represents a positive integer. Each hidden layer 236 includes multiple neurons, such as neurons 242-1, 242-2 ... 242-Y, where Y is a positive integer. Each neuron 242 is connected to at least one other neuron 242 in another hidden layer 236. A quantity of neurons 242 can be similar or different for different hidden layers 236. In some cases, a hidden layer 236 can be a replica of a previous layer (e.g., layer 240-2 can be a replica of layer 240-1). The output layer 234 includes outputs 244-1, 244-2 ... 244-Z, where Z represents a positive integer. A variety of different deep neural networks 230 can be used with various quantities of inputs 238, hidden layers 236, neurons 242, and outputs 244.

In some cases, the deep neural network 230 is a recurrent deep neural network (e.g., a long short-term memory (LSTM) recurrent deep neural network) with connections between nodes forming a cycle to retain information from a previous portion of an input data sequence for a subsequent portion of the input data sequence. In other cases, the deep neural network 230 is a feed-forward deep neural network in which the connections between the nodes do not form a cycle. Additionally or alternatively, the frame-of-reference machine-learned module 222 can include another type of neural network, such as a convolutional neural network.

Generally, a machine-learning architecture of the frame-of-reference machine-learned module 222 can be tailored based on available power, available memory, or computational capability. The machine-learning architecture can also be tailored to implement a classification model that indicates whether or not a frame-of-reference change is detected, a regression model that indicates probabilities associated with the frame-of-reference being stationary and moving, or another regression model that characterizes the changes to the frame of reference (e.g., describes the trajectory of the radar system 102 in terms of distance, direction, and/or velocity).

During operation, complex radar data 246 is provided to the input layer 232. The complex radar data 246 can include a complex range-Doppler map, complex interferometry data, multiple digital beat signals associated with a reflected radar signal, or frequency-domain representations of the multiple digital beat signals, as further described with respect to FIG. 5. Generally, the complex radar data 246 includes a matrix (or vector) of complex numbers. In some cases, each element of the matrix is provided to one of the inputs 238-1 to 238-X. In other cases, a quantity of contiguous elements are combined and provided to one of the inputs 238-1 to 238-X.

Each neuron 242 in the hidden layers 236 analyzes a different section or portion of the complex radar data 246 using an activation function. The neuron 242 activates (or inversely activates) when a specific type of characteristic is detected within the complex radar data 246. An example activation function can include, for example, a non-linear function such as a hyperbolic tangent function. Towards the top of FIG. 2-2, a neuron 242 is shown to obtain inputs $IN_1 W_1$, $IN_2 W_2$ ... $IN_X W_X$ and a bias $W_0$, where $IN_1$, $IN_2$ ... $IN_X$ correspond to outputs of a previous input or hidden layer (e.g., the layer 240-1 in FIG. 2-2) and $W_1$, $W_2$ ... $W_X$ correspond to respective weights that are applied to $IN_1$, $IN_2$ ... $IN_X$. An output (OUT) that is generated by the neuron 242 is determined based on the activation function $f(z)$. In the depicted example, X is equal to Y for a fully-connected network. The output OUT can be scaled by another weight and provided as an input to another layer 240 or the output layer 234.

At the output layer 234, the frame-of-reference machine-learned module 222 generates frame-of-reference data 248. As described above, the frame-of-reference data 248 can include a Boolean value that indicates whether or not a frame-of-reference change is detected, continuous values that indicate a first probability that the frame-of-reference is stationary and a second probability that the frame-of-reference is moving, or other continuous values that indicate the distance, direction, and/or speed associated with a change to the frame-of-reference.

With training, the frame-of-reference machine-learned module 222 can detect a frame-of-reference change by recognizing subtle patterns in a relative motion of at least one object. Additionally or alternatively, the frame-of-reference machine-learned module 222 also detects the frame-of-reference change by comparing (e.g., correlating) relative motions of two or more objects. The frame-of-reference machine-learned module 222 can compare different characteristics of the relative motions, including changes in position (e.g., range, azimuth, or elevation), range rate or Doppler, or velocity.

In some implementations, the frame-of-reference machine-learned module 222 relies on supervised learning and can use measured (e.g., real) data for machine-learning training purposes. In general, the real data is collected during situations in which the radar system 102 is moving and the object (e.g., the user) is stationary, the object (e.g., the user) is moving and the radar system 102 is stationary, and both the radar system 102 and the object are moving. Other scenarios can also include other objects that are moving or not moving. Some of the motions are made by a human, which can be difficult for closed-form signal processing techniques to identify. Training enables the frame-of-reference machine-learned module 222 to learn a non-linear mapping function for detecting a state of the frame-of-reference based on the complex radar data 246. In other implementations, the frame-of-reference machine-learned module 222 relies on unsupervised learning to determine the non-linear mapping function.

An example offline training procedure uses a motion-capture system to generate truth data for training the frame-of-reference machine-learned module 222. The motion-capture system can include multiple optical sensors, such as infrared-sensors or cameras, and measures positions of multiple markers that are placed on different portions of a person's body, such as on an arm, a hand, a torso, or a head. Some markers are also positioned on the smart device 104 or the radar system 102. While the person or the radar system 102 moves, the complex radar data 246 from the radar system 102 and position data from the motion-capture system are recorded. The complex radar data 246 represents training data. The position data recorded from the motion-capture system is converted into a format that conforms with the frame-of-reference data 248 and represents truth data. The truth data and the training data are synchronized in time, and provided to the frame-of-reference machine-learned module 222. The frame-of-reference machine-learned module 222 generates estimates of the frame-of-reference data 248 based on the training data, and determines amounts of error between the estimated frame-of-reference data 248 and the truth data. The frame-of-reference machine-learned module 222 adjusts machine-learning parameters (e.g., weights and biases) to minimize these errors. Based on this offline training procedure, the determined weights and biases are pre-programmed into the frame-of-reference machine-learned module 222 to enable detection of subsequent frame-of-reference changes using machine learning. In some cases, the offline training procedure can provide a relatively noise-free environment and high-resolution truth data for training the frame-of-reference machine-learned module 222.

Additionally or alternatively, a real-time training procedure can use available sensors within the smart device 104 to generate truth data for training the frame-of-reference machine-learned module 222. In this case, a training procedure can be initiated by a user of the smart device 104. While the user moves around the smart device 104 and/or moves the smart device 104, data from one or more sensor (e.g., an accelerometer, a gyroscope, an inertial sensor, a camera, or an infra-red sensor) of the smart device 104 and the complex radar data 246 generated by the radar system 102 are collected and provided to the frame-of-reference machine-learned module 222. The frame-of-reference machine-learned module 222 determines or adjusts machine-learning parameters to minimize errors between the estimated frame-of-reference data 248 and the truth data provided by the sensor. Using the real-time training procedure, the frame-of-reference machine-learned module 222 can be tailored to the user, account for current environmental conditions, and account for a current position or orientation of the smart device 104.

Figures 1, 3:
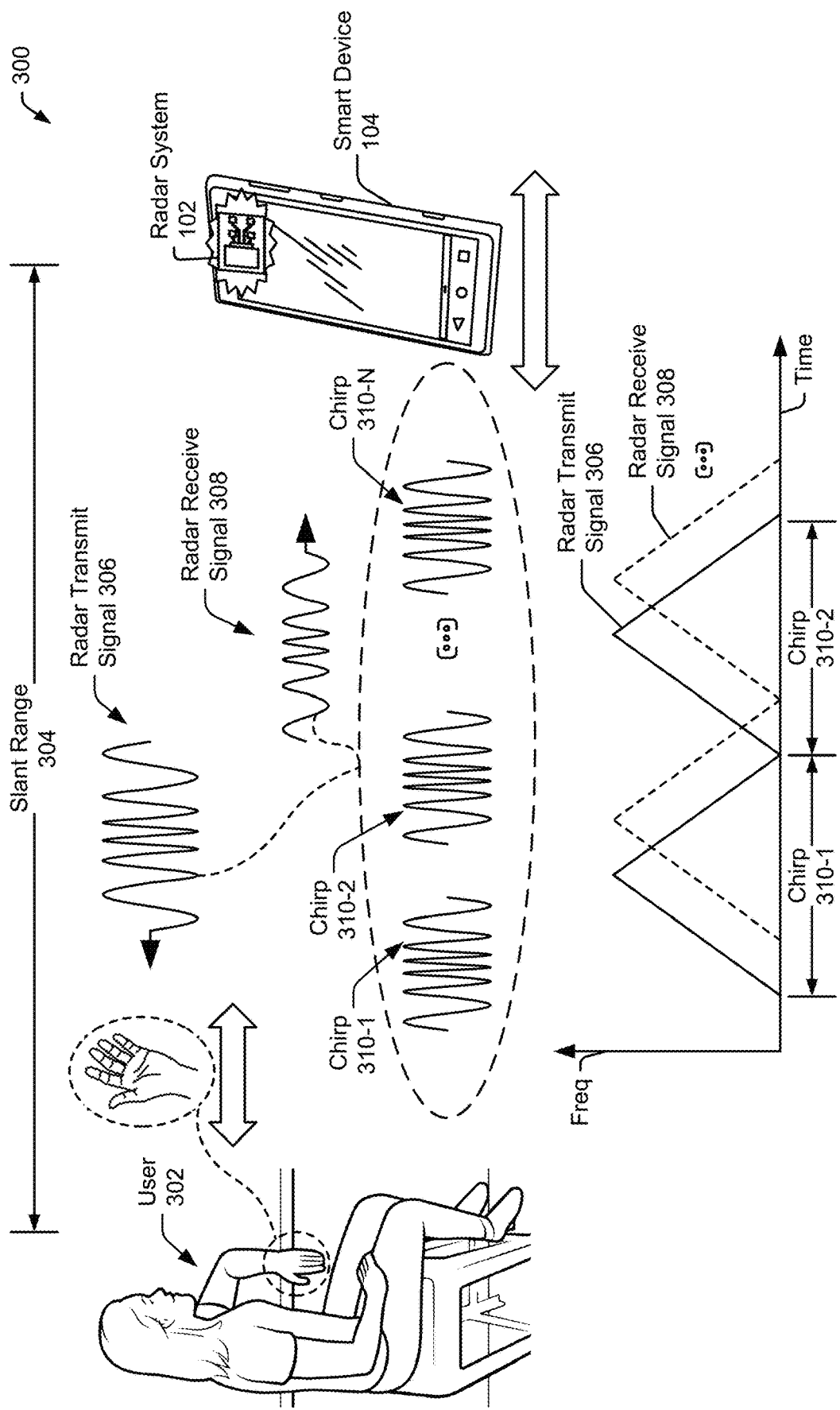
Figures 2, 3:
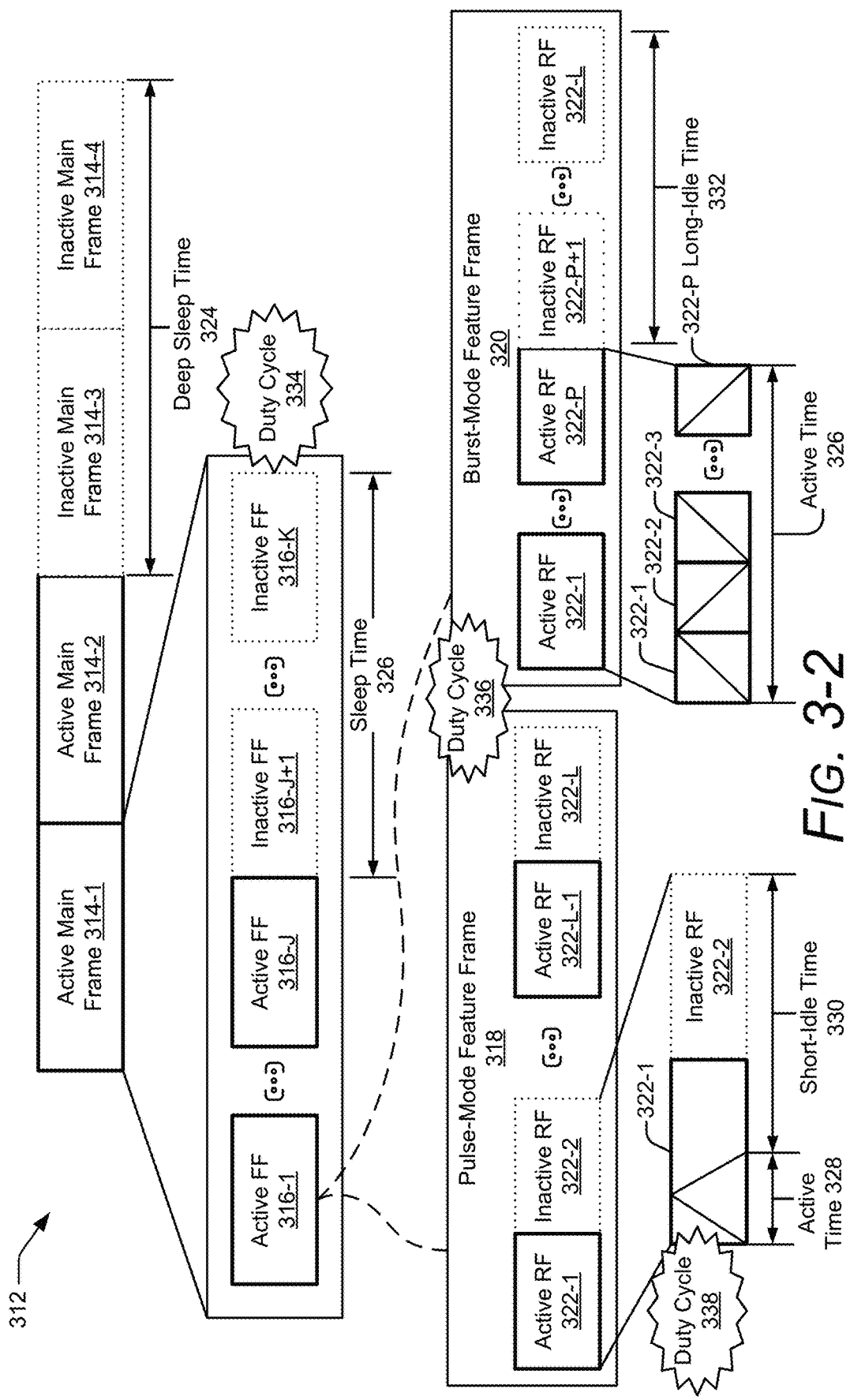

FIG. 3-1 illustrates an example operation of the radar system 102. In the depicted configuration, the radar system 102 is implemented as a frequency-modulated continuous-wave radar. However, other types of radar architectures can be implemented, as described above with respect to FIG. 2. In environment 300, a user 302 is located at a particular slant range 304 from the radar system 102. To detect the user 302, the radar system 102 transmits a radar transmit signal 306. At least a portion of the radar transmit signal 306 is reflected by the user 302. This reflected portion represents a radar receive signal 308. The radar system 102 receives the radar receive signal 308 and processes the radar receive signal 308 to extract data for the radar-based application 206. As depicted, an amplitude of the radar receive signal 308 is smaller than an amplitude of the radar transmit signal 306 due to losses incurred during propagation and reflection.

The radar transmit signal 306 includes a sequence of chirps 310-1 to 310-N, where N represents a positive integer greater than one. The radar system 102 can transmit the chirps 310-1 to 310-N in a continuous burst or transmit the chirps 310-1 to 310-N as time-separated pulses, as further described with respect to FIG. 3-2. A duration of each chirp 310-1 to 310-N can be on the order of tens or thousands of microseconds (e.g., between approximately 30 microseconds (μs) and 5 milliseconds (ms)), for instance.

Individual frequencies of the chirps 310-1 to 310-N can increase or decrease over time. In the depicted example, the radar system 102 employs a two-slope cycle (e.g., triangular frequency modulation) to linearly increase and linearly decrease the frequencies of the chirps 310-1 to 310-N over time. The two-slope cycle enables the radar system 102 to measure the Doppler frequency shift caused by motion of the user 302. In general, transmission characteristics of the chirps 310-1 to 310-N (e.g., bandwidth, center frequency, duration, and transmit power) can be tailored to achieve a particular detection range, range resolution, or doppler sensitivity for detecting one or more characteristics the user 302 or one or more actions performed by the user 302.

At the radar system 102, the radar receive signal 308 represents a delayed version of the radar transmit signal 306. The amount of delay is proportional to the slant range 304 (e.g., distance) from the antenna array 212 of the radar system 102 to the user 302. In particular, this delay represents a summation of a time it takes for the radar transmit signal 306 to propagate from the radar system 102 to the user 302 and a time it takes for the radar receive signal 308 to propagate from the user 302 to the radar system 102. If the user 302 and/or the radar system 102 is moving, the radar receive signal 308 is shifted in frequency relative to the radar transmit signal 306 due to the Doppler effect. In other words, characteristics of the radar receive signal 308 are dependent upon motion of the hand and/or motion of the radar system 102. Similar to the radar transmit signal 306, the radar receive signal 308 is composed of one or more of the chirps 310-1 to 310-N.

The multiple chirps 310-1 to 310-N enable the radar system 102 to make multiple observations of the user 302 over a predetermined time period. A radar framing structure determines a timing of the chirps 310-1 to 310-N, as further described with respect to FIG. 3-2.

FIG. 3-2 illustrates an example radar framing structure 312 for detecting a frame-of-reference change. In the depicted configuration, the radar framing structure 312 includes three different types of frames. At a top level, the radar framing structure 312 includes a sequence of main frames 314, which can be in the active state or the inactive state. Generally speaking, the active state consumes a larger amount of power relative to the inactive state. At an intermediate level, the radar framing structure 312 includes a sequence of feature frames 316, which can similarly be in the active state or the inactive state. Different types of feature frames 316 include a pulse-mode feature frame 318 (shown at the bottom-left of FIG. 3-2) and a burst-mode feature frame 320 (shown at the bottom-right of FIG. 3-2). At a low level, the radar framing structure 312 includes a sequence of radar frames (RF) 322, which can also be in the active state or the inactive state.

The radar system 102 transmits and receives a radar signal during an active radar frame 322. In some situations, the radar frames 322 are individually analyzed for basic radar operations, such as search and track, clutter map generation, user location determination, and so forth. Radar data collected during each active radar frame 322 can be saved to a buffer after completion of the radar frame 322 or provided directly to the system processor 216 of FIG. 2.

The radar system 102 analyzes the radar data across multiple radar frames 322 (e.g., across a group of radar frames 322 associated with an active feature frame 316) to identify a particular feature. Example types of features include a particular type of motion, a motion associated with a particular appendage (e.g., a hand or individual fingers), and a feature associated with different portions of the gesture. To detect a change in the radar system 102's frame of reference or recognize a gesture performed by the user 302 during an active main frame 314, the radar system 102 analyzes the radar data associated with one or more active feature frames 316.

A duration of the main frame 314 may be on the order of milliseconds or seconds (e.g., between approximately 10 ms and 10 seconds (s)). After active main frames 314-1 and 314-2 occur, the radar system 102 is inactive, as shown by inactive main frames 314-3 and 314-4. A duration of the inactive main frames 314-3 and 314-4 is characterized by a deep sleep time 324, which may be on the order of tens of milliseconds or more (e.g., greater than 50 ms). In an example implementation, the radar system 102 turns off all of the active components (e.g., an amplifier, an active filter, a voltage-controlled oscillator (VCO), a voltage-controlled buffer, a multiplexer, an analog-to-digital converter, a phase-lock loop (PLL) or a crystal oscillator) within the transceiver 214 to conserve power during the deep sleep time 324.

In the depicted radar framing structure 312, each main frame 314 includes K feature frames 316, where K is a positive integer. If the main frame 314 is in the inactive state, all of the feature frames 316 associated with that main frame 314 are also in the inactive state. In contrast, an active main frame 314 includes J active feature frames 316 and K-J inactive feature frames 316, where J is a positive integer that is less than or equal to K. A quantity of feature frames 316 can be adjusted based on a complexity of the environment or a complexity of a gesture. For example, a main frame 314 can include a few to a hundred feature frames 316 (e.g., K may equal 2, 10, 30, 60, or 100). A duration of each feature frame 316 may be on the order of milliseconds (e.g., between approximately 1 ms and 50 ms).

To conserve power, the active feature frames 316-1 to 316-J occur prior to the inactive feature frames 316-(J+1) to 316-K. A duration of the inactive feature frames 316-(J+1) to 316-K is characterized by a sleep time 326. In this way, the inactive feature frames 316-(J+1) to 316-K are consecutively executed such that the radar system 102 can be in a powered-down state for a longer duration relative to other techniques that may interleave the inactive feature frames 316-(J+1) to 316-K with the active feature frames 316-1 to 316-J. Generally speaking, increasing a duration of the sleep time 326 enables the radar system 102 to turn off components within the transceiver 214 that require longer start-up times.

Each feature frame 316 includes L radar frames 322, where L is a positive integer that may or may not be equal to J or K. In some implementations, a quantity of radar frames 322 may vary across different feature frames 316 and may comprise a few frames or hundreds of frames (e.g., L may equal 5, 15, 30, 100, or 500). A duration of a radar frame 322 may be on the order of tens or thousands of microseconds (e.g., between approximately 30 µs and 5 ms). The radar frames 322 within a particular feature frame 316 can be customized for a predetermined detection range, range resolution, or doppler sensitivity, which facilitates detection of a particular feature or gesture. For example, the radar frames 322 may utilize a particular type of modulation, bandwidth, frequency, transmit power, or timing. If the feature frame 316 is in the inactive state, all of the radar frames 322 associated with that feature frame 316 are also in the inactive state.

The pulse-mode feature frame 318 and the burst-mode feature frame 320 include different sequences of radar frames 322. Generally speaking, the radar frames 322 within an active pulse-mode feature frame 318 transmit pulses that are separated in time by a predetermined amount. This disperses observations over time, which can make it easier for the radar system 102 to detect the frame-of-reference change due to larger changes in the observed chirps 310-1 to 310-N within the pulse-mode feature frame 318 relative to the burst-mode feature frame 320. In contrast, the radar frames 322 within an active burst-mode feature frame 320 transmit pulses continuously across a portion of the burst-mode feature frame 320 (e.g., the pulses are not separated by a predetermined amount of time). This enables an active-burst-mode feature frame 320 to consume less power than the pulse-mode feature frame 318 by turning off a larger quantity of components, including those with longer start-up times, as further described below.

Within each active pulse-mode feature frame 318, the sequence of radar frames 322 alternates between the active state and the inactive state. Each active radar frame 322 transmits a chirp 310 (e.g., a pulse), which is illustrated by a triangle. A duration of the chirp 310 is characterized by an active time 328. During the active time 328, components within the transceiver 214 are powered-on. During a short-idle time 330, which includes the remaining time within the active radar frame 322 and a duration of the following inactive radar frame 322, the radar system 102 conserves power by turning off one or more active components within the transceiver 214 that have a start-up time within a duration of the short-idle time 330.

An active burst-mode feature frame 320 includes P active radar frames 322 and L-P inactive radar frames 322, where P is a positive integer that is less than or equal to L. To conserve power, the active radar frames 322-1 to 322-P occur prior to the inactive radar frames 322-(P+1) to 322-L. A duration of the inactive radar frames 322-(P+1) to 322-L is characterized by a long-idle time 332. By grouping the inactive radar frames 322-(P+1) to 322-L together, the radar system 102 can be in a powered-down state for a longer duration relative to the short-idle time 330 that occurs during the pulse-mode feature frame 318. Additionally, the radar system 102 can turn off additional components within the transceiver 214 that have start-up times that are longer than the short-idle time 330 and shorter than the long-idle time 332.

Each active radar frame 322 within an active burst-mode feature frame 320 transmits a portion of the chirp 310. In this example, the active radar frames 322-1 to 322-P alternate between transmitting a portion of the chirp 310 that increases in frequency and a portion of the chirp 310 that decreases in frequency.

The radar framing structure 312 enables power to be conserved through adjustable duty cycles within each frame type. A first duty cycle 334 is based on a quantity of active feature frames 316 (J) relative to a total quantity of feature frames 316 (K). A second duty cycle 336 is based on a quantity of active radar frames 322 (e.g., L/2 or P) relative to a total quantity of radar frames 322 (L). A third duty cycle 338 is based on a duration of the chirp 310 relative to a duration of a radar frame 322.

Consider an example radar framing structure 312 for a power state that consumes approximately 2 milliwatts (mW) of power and has a main-frame update rate between approximately 1 and 4 hertz (Hz). In this example, the radar framing structure 312 includes a main frame 314 with a duration between approximately 250 ms and 1 second. The main frame 314 includes thirty-one pulse-mode feature frames 318 (e.g., K is equal to 31). One of the thirty-one pulse-mode feature frames 318 is in the active state. This results in the duty cycle 334 being approximately equal to 3.2%. A duration of each pulse-mode feature frame 318 is between approximately 8 and 32 ms. Each pulse-mode feature frame 318 is composed of eight radar frames 322 (e.g., L is equal to 8). Within the active pulse-mode feature frame 318, all eight radar frames 322 are in the active state. This results in the duty cycle 336 being equal to 100%. A duration of each radar frame 322 is between approximately 1 and 4 ms. An active time 328 within each of the active radar frames 322 is between approximately 32 and 128 µs. As such, the resulting duty cycle 338 is approximately 3.2%. This example radar framing structure 312 has been found to yield good performance results. These good performance results are in terms of good frame-of-reference detection, gesture recognition, and presence detection while also yielding good power efficiency results in the application context of a handheld smartphone in a low-power state. Generation of the radar transmit signal 306 (of FIG. 3-1) and the processing of the radar receive signal 308 (of FIG. 3-1) are further described with respect to FIG. 4.

Figure 4:
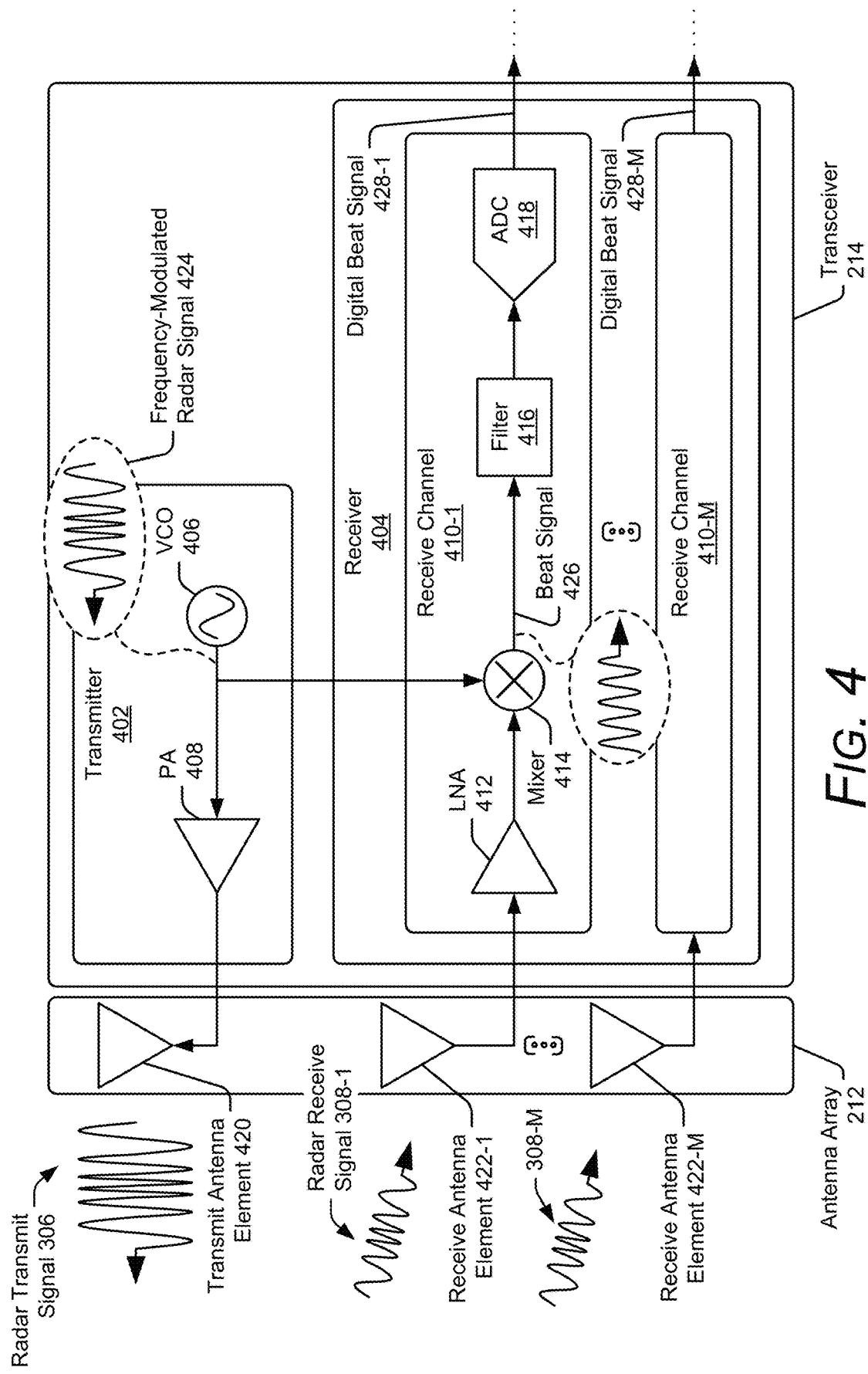
FIG. 4 illustrates an example antenna array and an example transceiver of a radar system.

FIG. 4 illustrates an example antenna array 212 and an example transceiver 214 of the radar system 102. In the depicted configuration, the transceiver 214 includes a transmitter 402 and a receiver 404. The transmitter 402 includes at least one voltage-controlled oscillator 406 and at least one power amplifier 408. The receiver 404 includes at least two receive channels 410-1 to 410-M, where M is a positive integer greater than one. Each receive channel 410-1 to 410-M includes at least one low-noise amplifier 412, at least one mixer 414, at least one filter 416, and at least one analog-to-digital converter 418.

The antenna array 212 includes at least one transmit antenna element 420 and at least two receive antenna elements 422-1 to 422-M. The transmit antenna element 420 is coupled to the transmitter 402. The receive antenna elements 422-1 to 422-M are respectively coupled to the receive channels 410-1 to 410-M.

During transmission, the voltage-controlled oscillator 406 generates a frequency-modulated radar signal 424 at radio frequencies. The power amplifier 408 amplifies the frequency-modulated radar signal 424 for transmission via the transmit antenna element 420. The transmitted frequency-modulated radar signal 424 is represented by the radar transmit signal 306, which can include multiple chirps 310-1 to 310-N based on the radar framing structure 312 of FIG. 3-2. As an example, the radar transmit signal 306 is generated according to the burst-mode feature frame 320 of FIG. 3-2 and includes 16 chirps 310 (e.g., N equals 16).

During reception, each receive antenna element 422-1 to 422-M receives a version of the radar receive signal 308-1 to 308-M. In general, relative phase differences between these versions of the radar receive signals 308-1 to 308-M are due to differences in locations of the receive antenna elements 422-1 to 422-M. Within each receive channel 410-1 to 410-M, the low-noise amplifier 412 amplifies the radar receive signal 308, and the mixer 414 mixes the amplified radar receive signal 308 with the frequency-modulated radar signal 424. In particular, the mixer performs a beating operation, which downconverts and demodulates the radar receive signal 308 to generate a beat signal 426.

A frequency of the beat signal 426 represents a frequency difference between the frequency-modulated radar signal 424 and the radar receive signal 308, which is proportional to the slant range 304 of FIG. 3-1. Although not shown, the beat signal 426 can include multiple frequencies, which represents reflections from different portions of the user 302 (e.g., different fingers, different portions of a hand, or different body parts). In some cases, these different portions move at different speeds, move in different directions, or are positioned at different slant ranges relative to the radar system 102.

The filter 416 filters the beat signal 426, and the analog-to-digital converter 418 digitizes the filtered beat signal 426. The receive channels 410-1 to 410-M respectively generate digital beat signals 428-1 to 428-M, which are provided to the system processor 216 for processing. The receive channels 410-1 to 410-M of the transceiver 214 are coupled to the system processor 216, as shown in FIG. 5.

Figure 5:
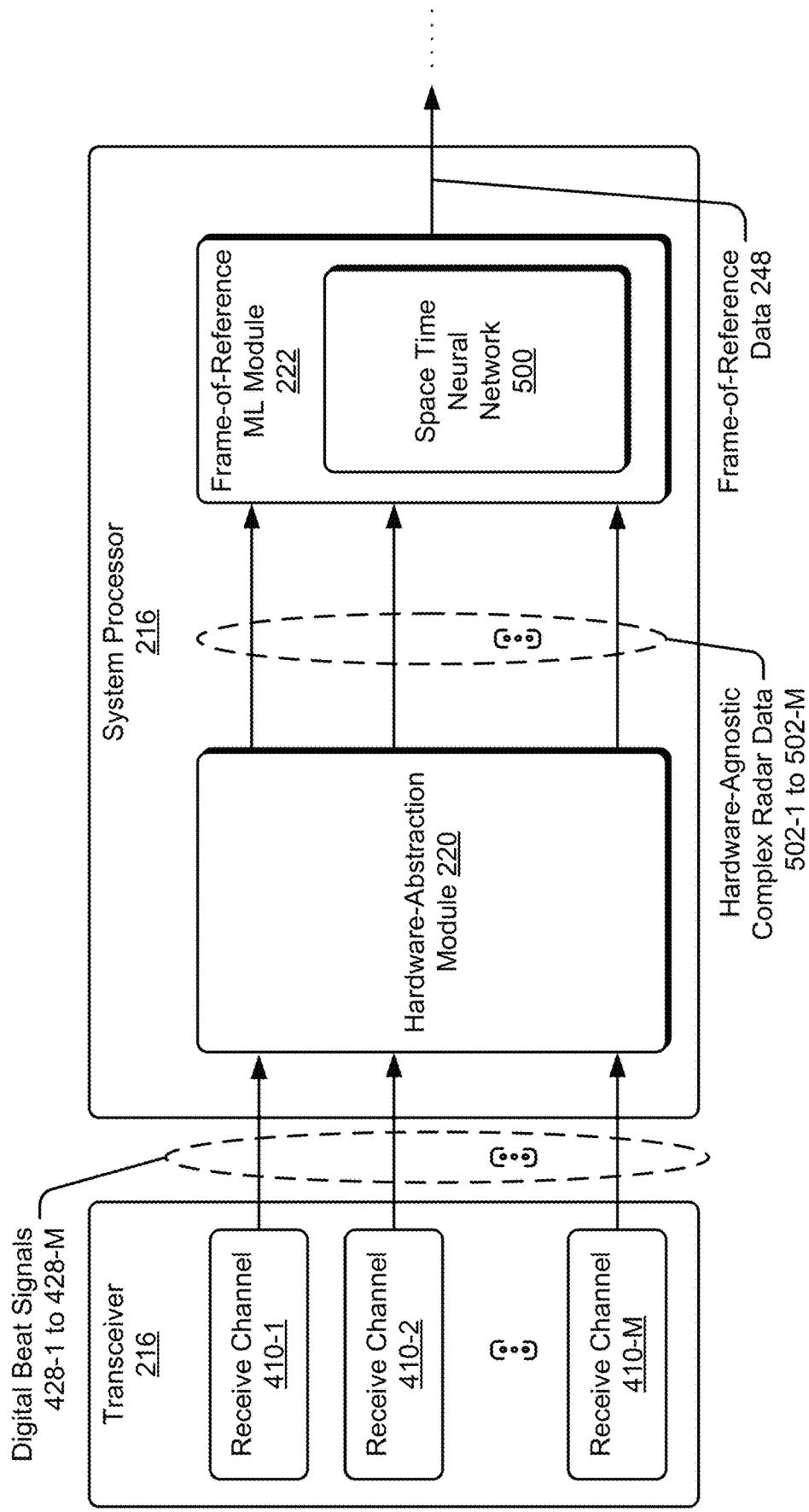
FIG. 5 illustrates an example scheme implemented by a radar system for detecting a frame-of-reference change.

FIG. 5 illustrates an example scheme implemented by the radar system 102 for detecting a frame-of-reference change. In the depicted configuration, the system processor 216 implements the hardware-abstraction module 220 and the frame-of-reference machine-learned module 222. The system processor 216 is connected to the receive channels 410-1 to 410-M. The system processor 216 can also communicate with the computer processor 202. Although not shown, the hardware-abstraction module 220 and/or the frame-of-reference machine-learned module 222 can be implemented by the computer processor 202.

In this example, the frame-of-reference machine-learned module 222 is implemented using a space time neural network 500, which includes a multi-stage machine-learning architecture. In the first stage, a space-recurrent network analyzes the complex radar data 246 over a spatial domain to generate feature data. The feature data identifies one or more features (e.g., characteristics) associated with at least one object's motion trajectory. The feature data is stored in a memory element of the circular buffer 224 for at least a portion of time. As time progresses, other feature data is stored in other memory elements of the circular buffer 224. The other feature data can correspond to the same object or another object. In the second stage, a time-recurrent network analyzes the feature data across multiple memory elements within the circular buffer 224 to detect the frame-of-reference change. The space time neural network 500 is further described with respect to FIGS. 7-1 to 7-4.

This multi-stage design enables the radar system 102 to conserve power and detect the frame-of-reference change in real time (e.g., as the gesture is performed). Use of the circular buffer 224, for example, enables the radar system 102 to conserve power and memory by mitigating the need to regenerate the feature data or store the complex radar data 246. Storing the feature data instead of the complex radar data 246 also reduces the computational time for detecting the frame-of-reference change. The space time neural network 500 is also adaptable and can be expanded to detect a frame-of-reference change in a variety of different situations without significantly increasing size, computational requirements, or latency. Additionally, the space time neural network 500 can be tailored to recognize multiple types of gestures, such as a swipe gesture and a reach gesture.

In this example, the hardware-abstraction module 220 accepts the digital beat signals 428-1 to 428-M from the receive channels 410-1 to 410-M. The digital beat signals 428-1 to 428-M represent raw or unprocessed complex radar data. The hardware-abstraction module 220 performs one or more operations to generate hardware-agnostic complex radar data 502-1 to 502-M based on digital beat signals 428-1 to 428-M. The hardware-abstraction module 220 transforms the complex radar data provided by the digital beat signals 428-1 to 428-M into a form that is expected by the space time neural network 500. In some cases, the hardware-abstraction module 220 normalizes amplitudes associated with different transmit power levels or transforms the complex radar data into a frequency-domain representation.

The hardware-agnostic complex radar data 502-1 to 502-M includes both magnitude and phase information (e.g., in-phase and quadrature components). In some implementations, the hardware-agnostic complex radar data 502-1 to 502-M includes range-Doppler maps for each receive channel 410-1 to 410-M and for a particular active feature frame 316. In other implementations, the hardware-agnostic complex radar data 502-1 to 502-M includes complex interferometry data, which is an orthogonal representation of the range-Doppler maps. As another example, the hardware-agnostic complex radar data 502-1 to 502-M includes frequency-domain representations of the digital beat signals 428-1 to 428-M for an active feature frame 316. Although not shown, other implementations of the radar system 102 can provide the digital beat signals 428-1 to 428-M directly to the space time neural network 500.

The space time neural network 500 uses a trained regression or classification model to analyze the hardware-agnostic complex radar data 502-1 to 502-M and generate the frame-of-reference data 248. Although described with respect to motion sensing, the training procedure executed by the space time neural network 500 and machine-learning architecture of the space time neural network 500 can be adapted to support other types of applications, including presence detection, gesture recognition, collision-avoidance, and human vital-sign detection. An example implementation of the space time neural network 500 is further described with respect to FIGS. 7-1 to 7-4.

Figure 6:
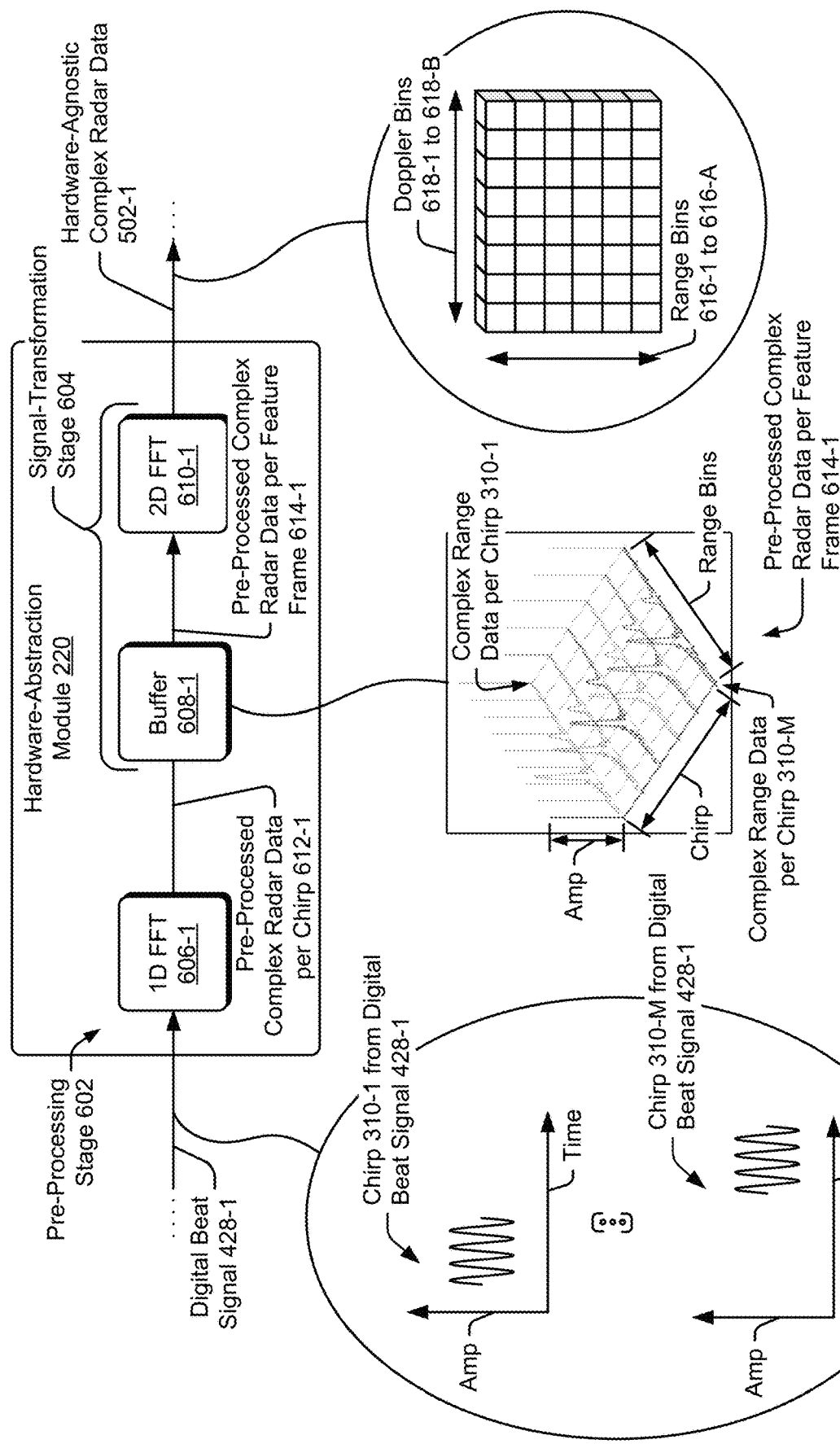
FIG. 6 illustrates an example portion of a hardware-abstraction module for detecting a frame-of-reference change.

FIG. 6 illustrates an example hardware-abstraction module 220 for detecting a frame-of-reference change. In the depicted configuration, the hardware-abstraction module 220 includes a pre-processing stage 602 and a signal-transformation stage 604. The pre-processing stage 602 operates on each chirp 310-1 to 310-N within the digital beat signals 428-1 to 428-M. In other words, the pre-processing stage 602 performs an operation for each active radar frame 322. In this example, the pre-processing stage 602 includes M one-dimensional (1D) Fast-Fourier Transform (FFT) modules, which respectively process the digital beat signals 428-1 to 428-M. Other types of modules that perform similar operations are also possible, such as a Fourier Transform module.

For simplicity, the hardware-abstraction module 220 is shown to process a digital beat signal 428-1 associated with the receive channel 410-1. The digital beat signal 428-1 includes the chirps 310-1 to 310-M, which are time-domain signals. The chirps 310-1 to 310-M are passed to a one-dimensional FFT module 606-1 in an order in which they are received and processed by the transceiver 214. Assuming the radar receive signals 308-1 to 308-M include 16 chirps 310-1 to 310-N (e.g., N equals 16), the one-dimensional FFT module 606-1 performs 16 FFT operations to generate pre-processed complex radar data per chirp 612-1.

The signal-transformation stage 604 operates on the sequence of chirps 310-1 to 310-M within each of the digital beat signals 428-1 to 428-M. In other words, the signal-transformation stage 604 performs an operation for each active feature frame 316. In this example, the signal-transformation stage 604 includes M buffers and M two-dimensional (2D) FFT modules. For simplicity, the signal-transformation stage 604 is shown to include a buffer 608-1 and a two-dimensional FFT module 610-1.

The buffer 608-1 stores a first portion of the pre-processed complex radar data 612-1, which is associated with the first chirp 310-1. The one-dimensional FFT module 606-1 continues to process subsequent chirps 310-2 to 310-N, and the buffer 608-1 continues to store the corresponding portions of the pre-processed complex radar data 612-1. This process continues until the buffer 608-1 stores a last portion of the pre-processed complex radar data 612-1, which is associated with the chirp 310-M.

At this point, the buffer 608-1 stores pre-processed complex radar data associated with a particular feature frame 614-1. The pre-processed complex radar data per feature frame 614-1 represents magnitude information (as shown) and phase information (not shown) across different chirps 310-1 to 310-N and across different range bins 616-1 to 616-A, where A represents a positive integer.

The two-dimensional FFT 610-1 accepts the pre-processed complex radar data per feature frame 614-1 and performs a two-dimensional FFT operation to form the hardware-agnostic complex radar data 502-1, which represents a range-Doppler map. The range-Doppler map includes complex radar data for the range bins 616-1 to 616-A and Doppler bins 618-1 to 618-B, where B represents a positive integer. In other words, each range bin 616-1 to 616-A and Doppler bin 618-1 to 618-B includes a complex number with real and imaginary parts that together represent magnitude and phase information. The quantity of range bins 616-1 to 616-A can be on the order of tens or hundreds, such as 64 or 128 (e.g., A equals 64 or 128). The quantity of Doppler bins can be on the order of tens or hundreds, such as 32, 64, or 124 (e.g., B equals 32, 64, or 124). The hardware-agnostic complex radar data 502-1, along with the hardware-agnostic complex radar data 502-1 to 502-M (of FIG. 6-1), are provided to the space time neural network 500, as shown in FIG. 7-1.

Figures 1, 7:
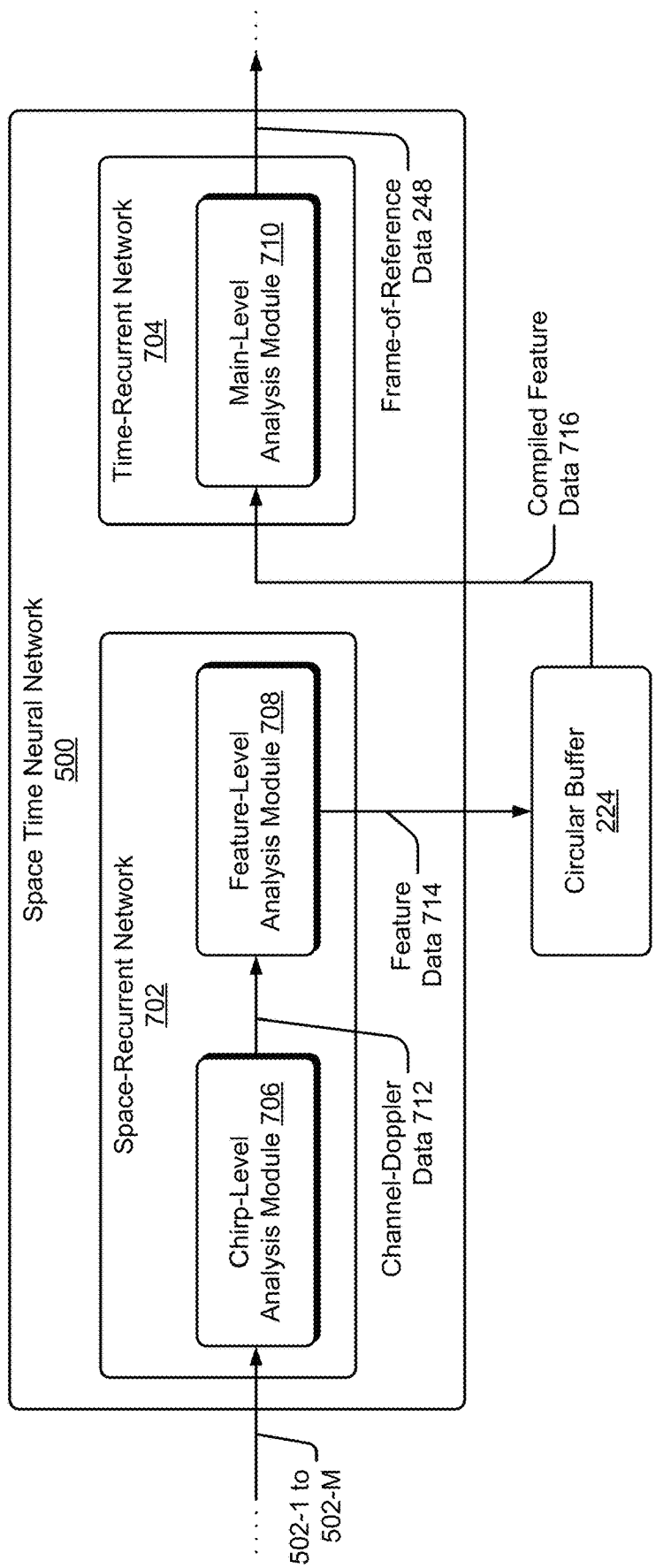
Figures 2, 7:
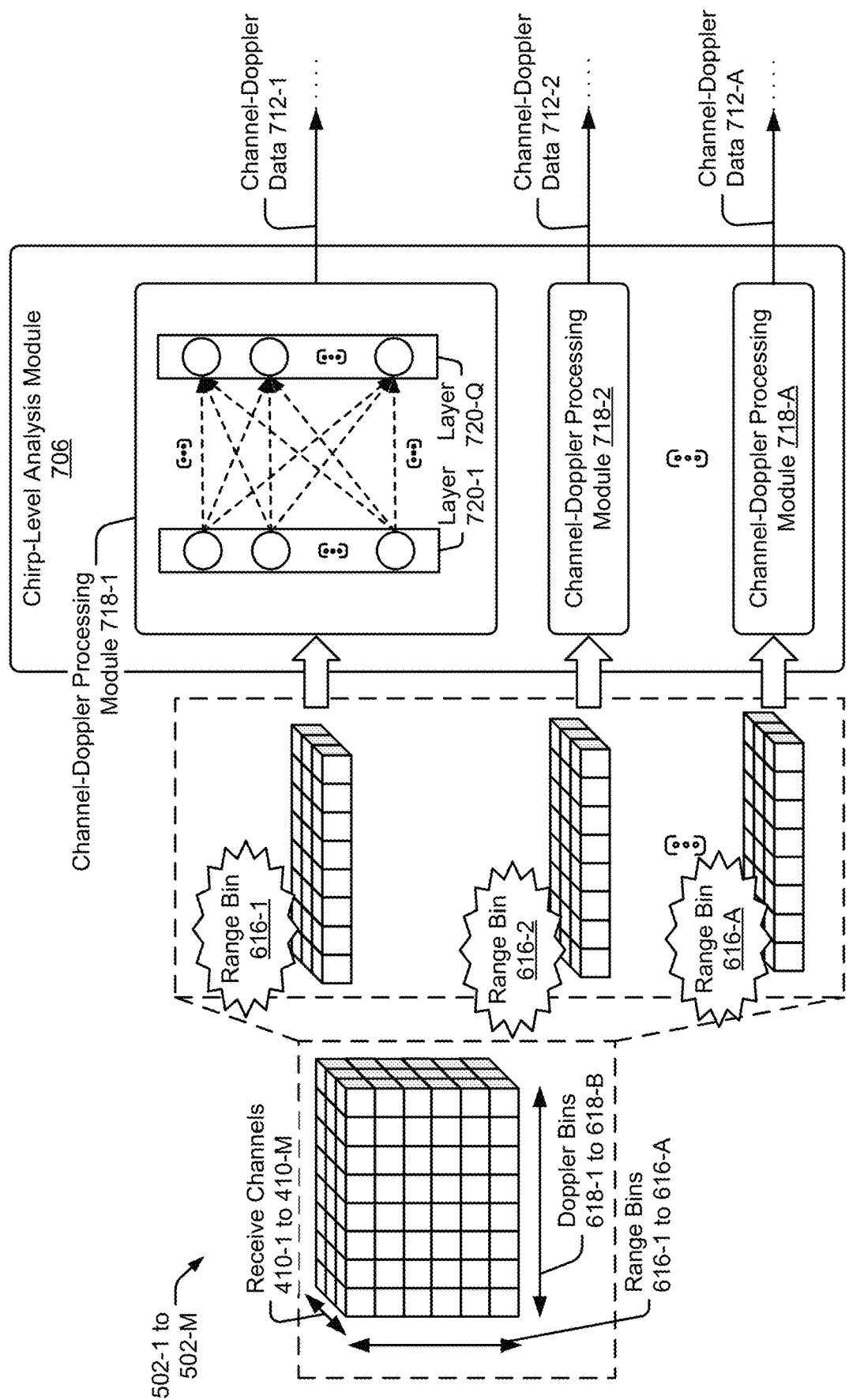
Figures 3, 7:
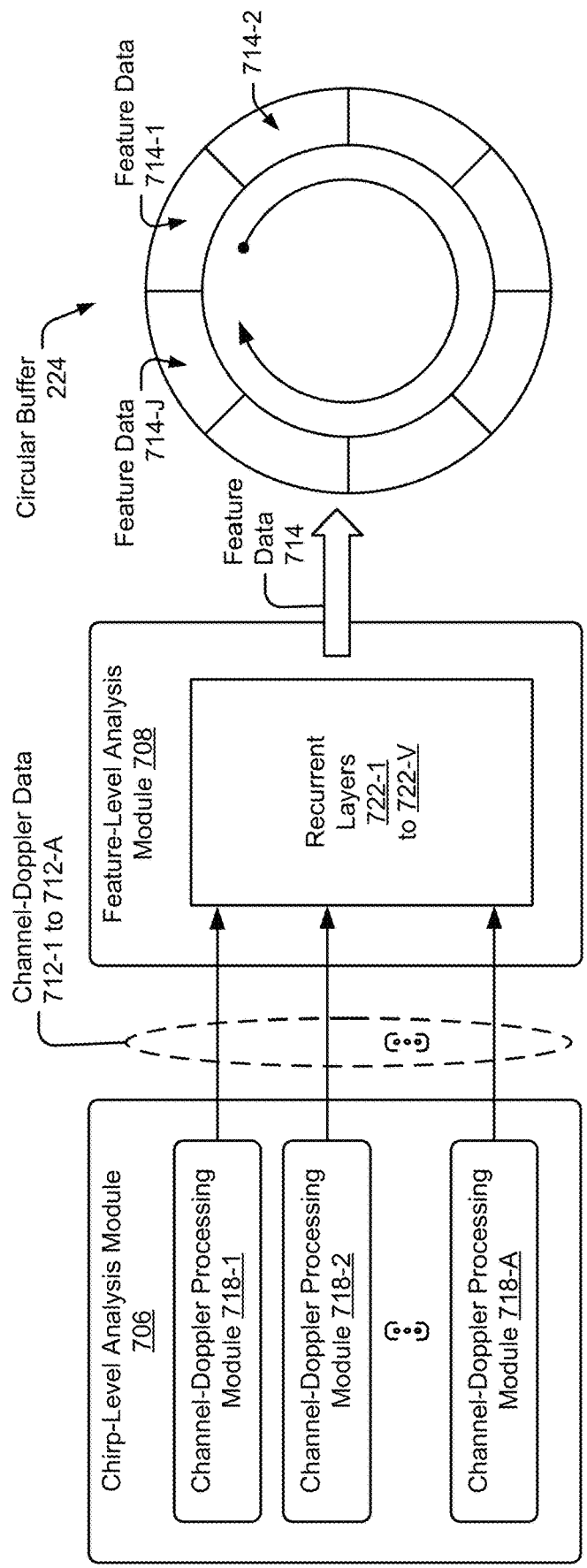
Figures 4, 7:
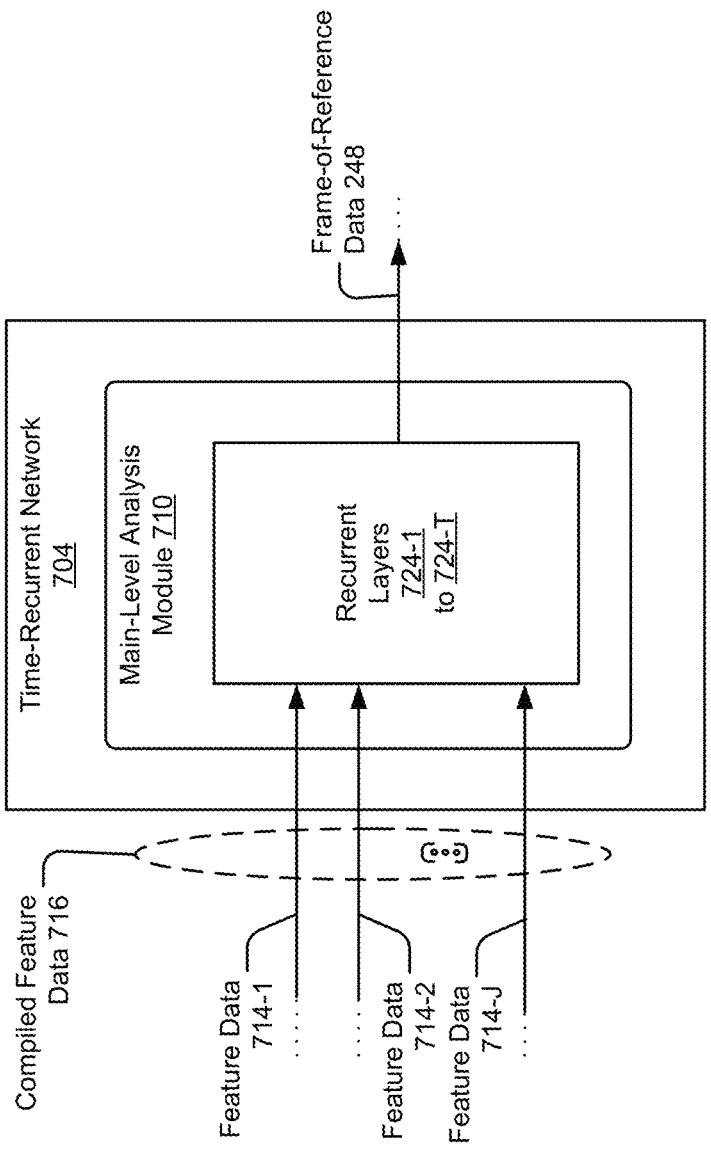

FIG. 7-1 illustrates an example space time neural network 500 for detecting a frame-of-reference change. In the depicted configuration, the space time neural network 500 includes two stages implemented by a space-recurrent network 702 and a time-recurrent network 704, respectively. The space-recurrent network 702 includes a chirp-level analysis module 706 and a feature-level analysis module 708. In general, the space-recurrent network 702 analyzes the hardware-agnostic complex radar data 502-1 to 502-M over a spatial domain for each active feature frame 316. The resulting data is stored by the circular buffer 224. The time-recurrent network 704 includes a main-level analysis module 710, which analyzes data stored within the circular buffer 224 for two or more active feature frames 316. In this manner, the time-recurrent network 704 analyzes data over a temporal domain for at least a portion of an active main frame 314.

During reception, the chirp-level analysis module 706 processes the complex radar data across each range bin 616-1 to 616-A to generate channel-Doppler data 712. The feature-level analysis module 708 analyzes the channel-Doppler data 712 to generate feature data 714, which characterizes one or more features for detecting the frame-of-reference change. These features can include relative motion of one or more objects detected by the radar system 102. The circular buffer 224 stores the feature data 714.

Over time, the circular buffer 224 stores feature data 714 associated with different active feature frames 316. Feature data 714 associated with two or more active feature frames 316 is referred to as compiled feature data 716. The compiled feature data 716 is provided to or accessed by the main-level analysis module 710. The main-level analysis module 710 analyzes the compiled feature data 716 to the frame-of-reference data 248. As an example, the radar-application data 504 includes a prediction regarding whether the frame-of-reference is moving. As feature data 714 associated with larger quantities of active feature frames 316 are stored by the circular buffer 224, an accuracy of the predictions improves. In some cases, the main-level analysis module 710 continually generates or updates the radar-application data 504 as subsequent feature frames 316 associated with a main frame 314 are processed by the space-recurrent network 702. Alternatively, the main-level analysis module 710 delays generation of the frame-of-reference data 248 until all of the feature frames 316 associated with the main frame 314 have been processed by the space-recurrent network 702. Implementations of the chirp-level analysis module 706, the feature-level analysis module 708, and the main-level analysis module 710 are further described with respect to FIGS. 7-2 to 7-4.

FIG. 7-2 illustrates an example chirp-level analysis module 706 of the space time neural network 500. In the depicted configuration, the chirp-level analysis module 706 includes channel-Doppler processing modules 718-1 to 718-A. Each channel-Doppler processing module 718-1 to 718-A includes a neural network with one or more layers 720-1 to 720-Q, where Q is a positive integer. The value of Q can vary depending on the implementation. As an example, Q can equal 2, 4, or 10. The layers 720-1 to 720-Q can be fully connected or partially connected. Nodes within the layers 720-1 to 720-Q execute a non-linear rectifier activation function, for instance. The channel-Doppler processing modules 718-1 to 718-A can also perform additions and multiplications.

The channel-Doppler processing modules 718-1 to 718-A accept respective portions of the hardware-agnostic complex radar data 502-1 to 502-M according to the range bins 616-1 to 616-A. In particular, the channel-Doppler processing module 718-1 accepts the complex radar data associated with the first range bin 616-1 across all of the receive channels 410-1 to 410-M and across all of the Doppler bins 618-1 to 618-B. Each complex number is provided as an input to individual nodes of the layer 720-1. The layers 720-1 to 720-Q analyze the data using the non-linear rectifier activation function to generate channel-Doppler data 712-1. Similar operations are also performed by the channel-Doppler processing modules 718-2 to 718-A. The combined channel-Doppler data 712-1 to 712-A represents a vector. For example, assuming there are three receive channels 410-1 to 410-M (e.g., M equals 3), 32 Doppler bins 618-1 to 618-B (e.g., B equals 32) and 16 range bins 616-1 to 616-A (e.g., A equals 16), the channel-Doppler data 712-1 to 712-A forms a 1×16 vector of values, which represents a relationship across the receive channels in the Doppler domain to enable the feature-level analysis module 708 to identify one or more features associated with the frame-of-reference change.

FIG. 7-3 illustrates an example feature-level analysis module 708 of the space time neural network 500. In the depicted configuration, the feature-level analysis module 708 is implemented using one or more recurrent layers 722-1 to 722-V, where V represents a positive integer. Within the recurrent layers 722-1 to 722-V, connections between the nodes form a cycle, which retains information from a previous active feature frame 316 for a subsequent active feature frame 316. Using the recurrent layers 722-1 to 722-V, the feature-level analysis module 708 can implement a long-short-term memory (LSTM) network, for instance.

As described above, the feature-level analysis module 708 processes the channel-Doppler data 712-1 to 712-A across the range bins 616-1 to 616-A to generate the feature data 714. Although not shown, some implementations of the space-recurrent network 702 can include additional fully-connected layers 720 connected to outputs of the recurrent layer 722-V. Similar to the layers 720 of the chirp-level analysis module 706, these layers 720 can also perform non-linear transformations.

Over time, feature data 714-1 to 714-J associated with active feature frames 316-1 to 316-J are sequentially stored by the circular buffer 224 in different memory elements. The feature data 714-1 to 714-J represents the compiled feature data 716, which is processed by the main-level analysis module 710, as further described with respect to FIG. 7-4.

FIG. 7-4 illustrates an example main-level analysis module 710 of the space time neural network 500. In the depicted configuration, the main-level analysis module 710 is implemented using one or more recurrent layers 724-1 to 724-T, where T represents a positive integer that may or may not be equal to V. Using the recurrent layers 724-1 to 724-T, the main-level analysis module 710 can implement a long-short-term memory (LSTM) network, for instance.

As described above, the main-level analysis module 710 processes two or more feature data 714-1 to 714-J stored within the circular buffer 224. For example, the main-level analysis module 710 forms a prediction regarding whether or not the frame-of-reference is moving based on two or more of the feature data 714-1 to 714-J. In some cases, the main-level analysis module 710 can wait to form the prediction until a specified quantity of feature data 714-1 to 714-J is available, such as 15. If the active main frame 314 includes more than 15 active feature frames 316 (e.g., J is greater than 15), the main-level analysis module 710 can continue to update its prediction based on the last 15 active feature frames 316. In general, an accuracy of the prediction increases over time or when larger quantities of feature data 714-1 to 714-J is analyzed.

Example Method

Figure 8:
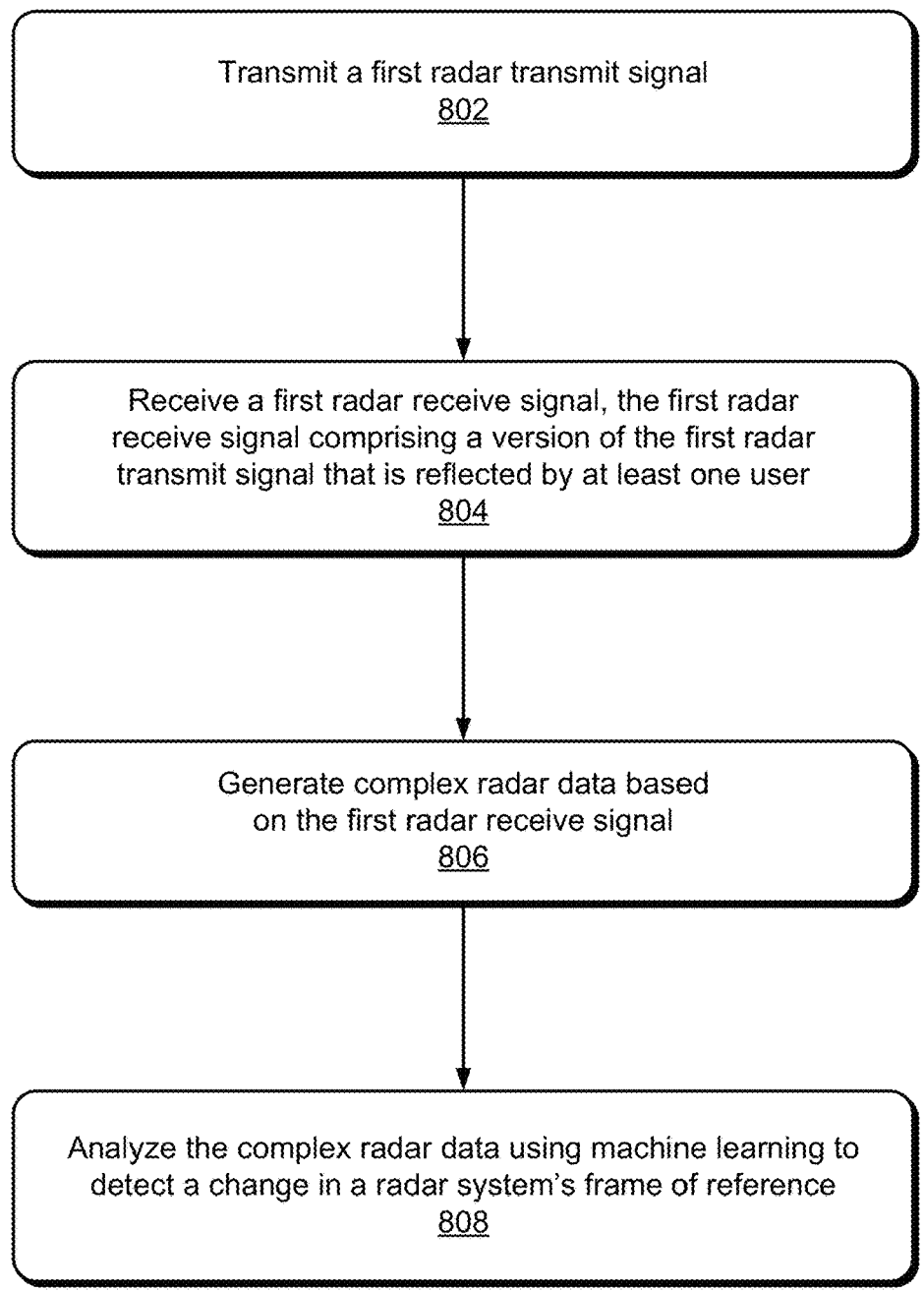
FIG. 8 illustrates an example method for performing operations of a smart-device-based radar system capable of detecting a frame-of-reference change.

FIG. 8 depicts an example method 800 for performing operations of a smart-device-based radar system capable of detecting a frame-of-reference change. Method 800 is shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to the environment 100-1 to 100-8 of FIG. 1, and entities detailed in FIG. 2, 4, or 5, reference to which is made for example only. The techniques are not limited to performance by one entity or multiple entities operating on one device.

At 802, a first radar transmit signal is transmitted. For example, the radar system 102 uses at least one transmit antenna element 420 to transmit the radar transmit signal 306, as shown in FIG. 4. In some implementations, the radar transmit signal 306 includes multiple chirps 310-1 to 310-N, whose frequencies are modulated, as shown in FIG. 3-1.

At 804, a first radar receive signal is received. The first radar receive signal comprises a version of the first radar transmit signal that is reflected by at least one user. For example, the radar system 102 uses at least one receive antenna element 422 to receive a version of the radar receive signal 308 that is reflected by the user 302, as shown in FIG. 4.

At 806, complex radar data is generated based on the first radar receive signal. For example, a receive channel 410 of the radar system 102 generates a digital beat signal 428 based on the radar receive signal 308. The digital beat signal represents complex radar data 246 and includes both magnitude and phase information.

At 808, the complex radar data is analyzed using machine learning to detect a change in the radar system's frame of reference. For example, the frame-of-reference machine-learned module 222 analyzes the digital beat signals 428-1 to 428-M or the hardware-agnostic complex radar data 502-1 to 502-M to generate the frame-of-reference data 248, which provides information regarding the radar system 102's frame of reference. This information can indicate whether the frame of reference is stationary, whether the frame of reference is moving, and/or characteristics regarding changes to the frame of reference (e.g., distance, direction, velocity). Although described for motion sensing, similar operations can also be performed for other applications, including presence detection, gesture recognition, collision avoidance, vital sign detection, and so forth.

Example Computing System

Figure 9:
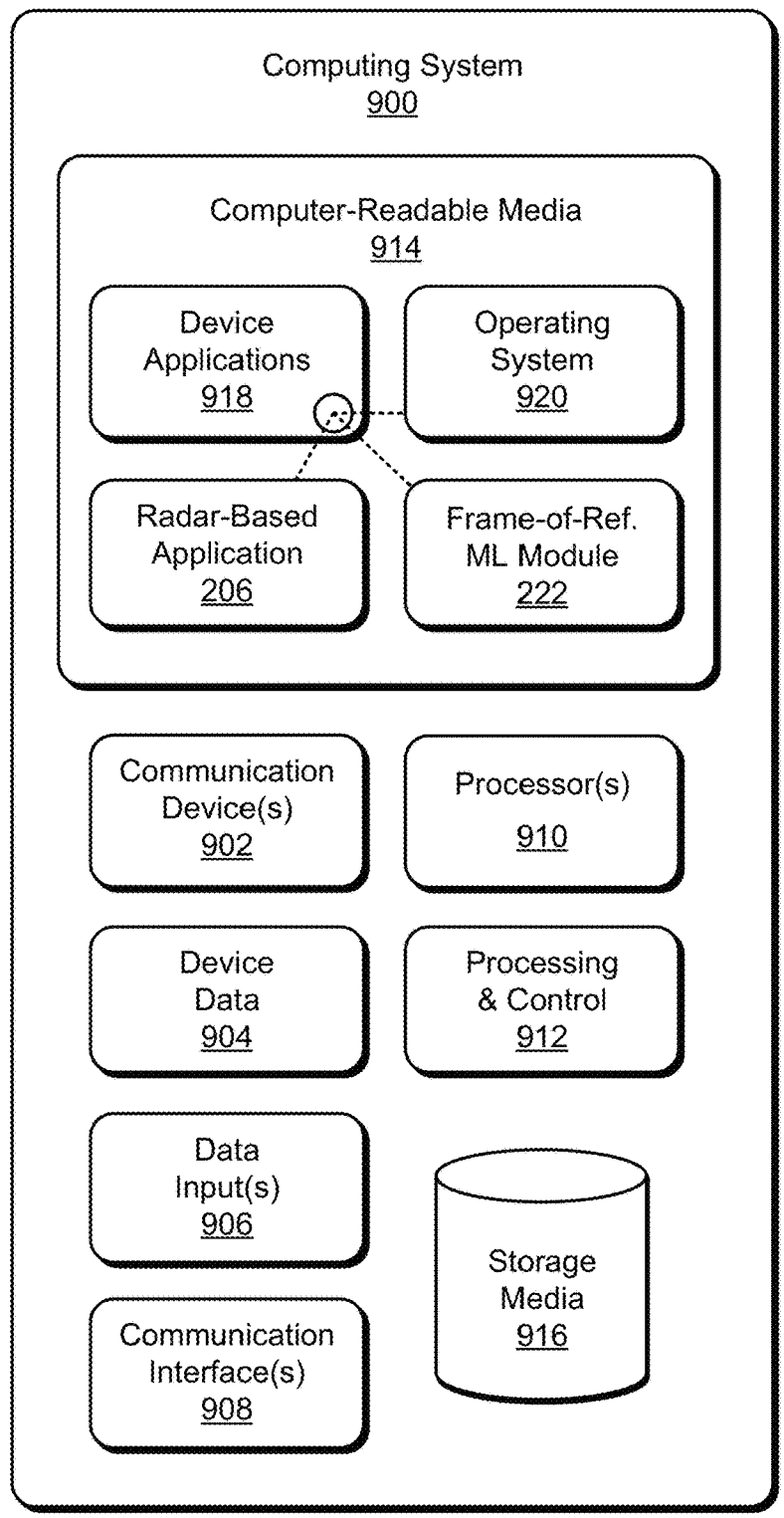
FIG. 9 illustrates an example computing system embodying, or in which techniques may be implemented that enable use of, a radar system capable of detecting a frame-of-reference change.

FIG. 9 illustrates various components of an example computing system 900 that can be implemented as any type of client, server, and/or computing device as described with reference to the previous FIG. 2 to detect a frame-of-reference change.

The computing system 900 includes communication devices 902 that enable wired and/or wireless communication of device data 904 (e.g., received data, data that is being received, data scheduled for broadcast, or data packets of the data). Although not shown, the communication devices 902 or the computing system 900 can include one or more radar systems 102. The device data 904 or other device content can include configuration settings of the device, media content stored on the device, and/or information associated with a user 302 of the device. Media content stored on the computing system 900 can include any type of audio, video, and/or image data. The computing system 900 includes one or more data inputs 906 via which any type of data, media content, and/or inputs can be received, such as human utterances, the radar-based application 206, user-selectable inputs (explicit or implicit), messages, music, television media content, recorded video content, and any other type of audio, video, and/or image data received from any content and/or data source.

The computing system 900 also includes communication interfaces 908, which can be implemented as any one or more of a serial and/or parallel interface, a wireless interface, any type of network interface, a modem, and as any other type of communication interface. The communication interfaces 908 provide a connection and/or communication links between the computing system 900 and a communication network by which other electronic, computing, and communication devices communicate data with the computing system 900.

The computing system 900 includes one or more processors 910 (e.g., any of microprocessors, controllers, and the like), which process various computer-executable instructions to control the operation of the computing system 900 and to enable techniques for, or in which can be embodied, gesture recognition in the presence of saturation. Alternatively or in addition, the computing system 900 can be implemented with any one or combination of hardware, firmware, or fixed logic circuitry that is implemented in connection with processing and control circuits which are generally identified at 912. Although not shown, the computing system 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 900 also includes a computer-readable media 914, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. The disk storage device may be implemented as any type of magnetic or optical storage device, such as a hard disk drive, a recordable and/or rewriteable compact disc (CD), any type of a digital versatile disc (DVD), and the like. The computing system 900 can also include a mass storage media device (storage media) 916.

The computer-readable media 914 provides data storage mechanisms to store the device data 904, as well as various device applications 918 and any other types of information and/or data related to operational aspects of the computing system 900. For example, an operating system 920 can be maintained as a computer application with the computer-readable media 914 and executed on the processors 910. The device applications 918 may include a device manager, such as any form of a control application, software application, signal-processing and control module, code that is native to a particular device, a hardware abstraction layer for a particular device, and so on.

The device applications 918 also include any system components, engines, or managers to detect a frame-of-reference change. In this example, the device applications 918 includes the radar-based application 206 and the frame-of-reference machine-learned module 222 of FIG. 2.

CONCLUSION

Although techniques using, and apparatuses including, a smart-device-based radar system detecting a frame-of-reference change have been described in language specific to features and/or methods, it is to be understood that the subject of the appended claims is not necessarily limited to the specific features or methods described. Rather, the specific features and methods are disclosed as example implementations of a smart-device-based radar system detecting a frame-of-reference change.

Some examples are described below.

Example 1: A method performed by a radar system, the method comprising:
transmitting a first radar transmit signal;
receiving a first radar receive signal, the first radar receive signal comprising a version of the first radar transmit signal that is reflected by at least one object;
generating complex radar data based on the first radar receive signal; and
analyzing the complex radar data using machine learning to detect a change in the radar system's frame of reference.

Example 2: The method of example 1, wherein the at least one object comprises at least one user,
the method further comprising:
determining that the radar system is moving based on the detected change in the radar system's frame of reference; and
responsive to determining that the radar system is moving, determining that the at least one user did not perform a gesture.

Example 3: The method of example 1 or example 2, further comprising:
transmitting a second radar transmit signal;
receiving a second radar receive signal, the second radar receive signal comprising a version of the second radar transmit signal that is reflected by at least one other object;
generating other complex radar data based on the second radar receive signal; and
analyzing the other complex radar data using the machine learning to determine that the radar system is stationary.

Example 4: The method of example 3, wherein the at least one other object comprises at least one other user,
the method further comprising:
responsive to determining that the radar system is stationary, recognizing, based on the other complex radar data, a gesture performed by the at least one other user.

Example 5: The method of any preceding example, wherein:
the at least one object comprises a first object and a second object; and
the analyzing the complex radar data comprises:
determining relative motion of the first object based on the complex radar data;
determining relative motion of the second object based on the complex radar data; and
detecting the change in the radar system's frame of reference by using the machine learning to compare the relative motion of the first object with the relative motion of the second object.

Example 6: The method of example 5, wherein:
the first object is stationary and the second object is stationary;
the first object is stationary and the second object is moving; or
the first object is moving and the second object is moving.

Example 7: The method of example 5, wherein the determining the relative motion of the first object, the determining the relative motion of the second object, and the detecting the change in the radar system's frame of reference comprises:
analyzing, using a space-recurrent network, the complex radar data over a spatial domain to generate feature data; and
analyzing, using a time-recurrent network, the feature data over a temporal domain to recognize the gesture.

Example 8: The method of example 7, further comprising:
storing the feature data within a circular buffer; and
accessing, by the time-recurrent network, the feature data stored within the circular buffer.

Example 9: The method of example 7 or 8, wherein the analyzing the complex radar data over the spatial domain comprises:
separately processing portions of the complex radar data associated with different range bins using a non-linear activation function to generate channel-Doppler data for each range bin; and
analyzing the channel-Doppler data across the different range bins to generate the feature data.

Example 10: The method of any of examples 7 to 9, wherein the analyzing the feature data over the temporal domain comprises forming a prediction regarding a likelihood of the radar system's frame of reference moving and the radar system's frame of reference being stationary.

Example 11: The method of any preceding example, wherein the analyzing the complex radar data comprises analyzing magnitude and/or phase information of the complex radar data using the machine learning.

Example 12: The method of any preceding example, wherein the complex radar data comprises in-phase components and quadrature components.

Example 13: The method of any preceding example, wherein the complex radar data comprises at least one of the following:
a complex range-Doppler map;
complex interferometry data;
multiple digital beat signals associated with the radar receive signal; or frequency-domain representations of the multiple digital beat signals.

Example 14: The method of any preceding example, wherein the first radar transmit signal comprises at least one chirp.

Example 15: The method of any preceding example, wherein the machine learning uses at least one artificial neural network, in particular at least one artificial neural network with a deep neural network, in particular with a recurrent deep neural network.

Example 16: The method of any preceding example wherein the machine learning comprises supervised learning, in particular using real data for machine-learning training purposes.

Example 17: The method of any preceding example, wherein the machine learning comprises offline training and/or real-time training.

Example 18: The method of example 1, wherein:
the radar system is part of a smart device; and
the smart device does not include an inertial sensor or does not use the inertial sensor to detect the change in the radar system's frame of reference.

Example 19: An apparatus comprising:
a radar system comprising:
an antenna array;
a transceiver; and
a processor and computer-readable storage media configured to perform any of the methods of examples 1 to 17.

Example 20: The apparatus of example 19, wherein the apparatus comprises a smart device, the smart device comprising one of the following:
a smartphone;
a smart watch;
a smart speaker;
a smart thermostat;
a security camera;

a vehicle; or a household appliance.

Example 21: The apparatus of example 19, wherein:

the apparatus comprises a smart device; and the smart device does not include an inertial sensor or does not use the inertial sensor to detect the change in the radar system's frame of reference.

Example 22: A computer-readable storage media comprising computer-executable instructions that, responsive to execution by a processor, implement:

a frame-of-reference machine-learned module configured to:

accept complex radar data associated with a radar receive signal that is reflected by at least one object;

analyze the complex radar data using machine learning to generate frame-of-reference data; and determine, based on the frame-of-reference data, whether or not an antenna array that received the radar receive signal is stationary or moving.

Example 23: The computer-readable storage media of example 22, wherein the frame-of-reference machine-learned module is further configured to analyze both magnitude and phase information of the complex radar data to generate the frame-of-reference data.

Example 24: The computer-readable storage media of example 22 or example 23, wherein the frame-of-reference machine-learned module is further configured to:

analyze, using the machine learning, the complex radar data over a spatial domain to generate feature data; and analyze, using the machine learning, the feature data over a temporal domain to generate radar-application data.

Example 25: The computer-readable storage media of any of examples 22 to 24, wherein the computer-executable instructions, responsive to execution by the processor, implement a hardware-abstraction module configured to:

generate hardware-agnostic complex radar data based on the complex radar data; and provide, to the frame-of-reference machine-learned module, the hardware-agnostic complex radar data as the complex radar data.

Example 26: The computer-readable storage media of example 22, wherein:

the computer-readable storage media and the processor are part of a smart device; and the smart device does not include an inertial sensor or does not use the inertial sensor to detect the change in the radar system's frame of reference.

The invention claimed is:

1. A method performed by a radar system, the method comprising:

transmitting a first radar transmit signal;

receiving a first radar receive signal, the first radar receive signal comprising a version of the first radar transmit signal that is reflected by at least one object;

generating complex radar data based on the first radar receive signal; and analyzing the complex radar data using machine learning to detect a change in the radar system's frame of reference, the analyzing comprising detecting the change in the radar system's frame of reference by using the machine learning to compare a relative motion of a first object of the at least one object and a relative motion of a second object of the at least one object, the relative motion of the first object and the relative motion of the second object determined based on the complex radar data.

2. The method of claim 1, wherein the at least one object comprises at least one user, the method further comprising:

determining that the radar system is moving based on the detected change in the radar system's frame of reference; and responsive to determining that the radar system is moving, determining that the at least one user did not perform a gesture.

3. The method of claim 1, further comprising:

transmitting a second radar transmit signal;

receiving a second radar receive signal, the second radar receive signal comprising a version of the second radar transmit signal that is reflected by at least one other object;

generating other complex radar data based on the second radar receive signal; and analyzing the other complex radar data using the machine learning to determine that the radar system is stationary.

4. The method of claim 3, wherein the at least one other object comprises at least one user, the method further comprising:

responsive to determining that the radar system is stationary, recognizing, based on the other complex radar data, a gesture performed by the at least one other user.

5. The method of claim 1, wherein:

the first object is stationary and the second object is stationary;

the first object is stationary and the second object is moving; or the first object is moving and the second object is moving.

6. The method of claim 1, wherein the determining the relative motion of the first object, the determining the relative motion of the second object, and the detecting the change in the radar system's frame of reference comprises:

analyzing, using a space-recurrent network, the complex radar data over a spatial domain to generate feature data; and analyzing, using a time-recurrent network, the feature data over a temporal domain to recognize a gesture.

7. The method of claim 6, wherein the analyzing the complex radar data over the spatial domain comprises:

separately processing portions of the complex radar data associated with different range bins using a non-linear activation function to generate channel-Doppler data for each range bin; and analyzing the channel-Doppler data across the different range bins to generate the feature data.

8. The method of claim 6, wherein the analyzing the feature data over the temporal domain comprises forming a prediction regarding a likelihood of the radar system's frame of reference moving and the radar system's frame of reference being stationary.

9. The method of claim 1, wherein the complex radar data comprises at least one of the following:

a complex range-Doppler map;

complex interferometry data;

multiple digital beat signals associated with the radar receive signal; or frequency-domain representations of the multiple digital beat signals.

10. The method of claim 1, wherein:

the radar system is part of a smart device; and the smart device does not include an inertial sensor or does not use the inertial sensor to detect the change in the radar system's frame of reference.

11. An apparatus comprising:
a radar system configured to:
   transmit a first radar transmit signal;
   receive a first radar receive signal, the first radar receive signal comprising a version of the first radar transmit signal that is reflected by at least one object;
   generate complex radar data based on the first radar receive signal; and
   analyze the complex radar data using machine learning to detect a change in the radar system's frame of reference, the analysis comprising detecting the change in the radar system's frame of reference by using the machine learning to compare a relative motion of a first object of the at least one object and a relative motion of a second object of the at least one object, the relative motion of the first object and the relative motion of the second object determined based on the complex radar data.

12. The apparatus of claim 11, wherein:
the at least one object comprises at least one user; and
the radar system is configured to:
   determine that the radar system is moving based on the detected change in the radar system's frame of reference; and
   responsive to determining that the radar system is moving, determine that the at least one user did not perform a gesture.

13. The apparatus of claim 11, wherein the radar system is configured to:
   transmit a second radar transmit signal;
   receive a second radar receive signal, the second radar receive signal comprising a version of the second radar transmit signal that is reflected by at least one other object;
   generate other complex radar data based on the second radar receive signal; and
   analyze the other complex radar data using the machine learning to determine that the radar system is stationary.

14. The apparatus of claim 11, wherein the apparatus comprises a smart device, the smart device comprising one of the following:
   a smartphone;
   a smart watch;
   a smart speaker;
   a smart thermostat;
   a security camera;
   a vehicle; or
   a household appliance.

15. The apparatus of claim 11, wherein:
the apparatus comprises a smart device; and
the smart device does not include an inertial sensor or does not use the inertial sensor to detect the change in the radar system's frame of reference.

16. A computer-readable storage media comprising computer-executable instructions that, responsive to execution by a processor, implement:
a frame-of-reference machine-learned module configured to:
   accept complex radar data associated with a radar receive signal that is reflected by at least one object;
   analyze the complex radar data using machine learning to generate frame-of-reference data, the frame-of-reference data based at least in part on a comparison between a relative motion of a first object of the at least one object and a relative motion of a second object of the at least one object, the relative motion of the first object and the relative motion of the second object determined based on the complex radar data; and
   determine, based on the frame-of-reference data, whether or not an antenna array that received the radar receive signal is stationary or moving.

17. The computer-readable storage media of claim 16, wherein the frame-of-reference machine-learned module is further configured to analyze both magnitude and phase information of the complex radar data to generate the frame-of-reference data.

18. The computer-readable storage media of claim 16, wherein the frame-of-reference machine-learned module is further configured to:
   analyze, using the machine learning, the complex radar data over a spatial domain to generate feature data; and
   analyze, using the machine learning, the feature data over a temporal domain to generate radar-application data.

19. The computer-readable storage media of claim 18, wherein the analyzing the complex radar data over the spatial domain comprises:
   separately processing portions of the complex radar data associated with different range bins using a non-linear activation function to generate channel-Doppler data for each range bin; and
   analyzing the channel-Doppler data across the different range bins to generate the feature data.

20. The computer-readable storage media of claim 18, wherein the analyzing the feature data over the temporal domain comprises forming a prediction regarding a likelihood of the antenna array moving and the antenna array being stationary.

* * * * *